United States Patent
Shin et al.

(10) Patent No.: US 10,813,140 B2
(45) Date of Patent: Oct. 20, 2020

(54) METHOD AND APPARATUS FOR TRANSMITTING AND RECEIVING RANDOM ACCESS PREAMBLES IN A WIRELESS COMMUNICATION SYSTEM

(71) Applicant: LG Electronics Inc., Seoul (KR)

(72) Inventors: Seokmin Shin, Seoul (KR); Jaehyung Kim, Seoul (KR); Changhwan Park, Seoul (KR); Joonkui Ahn, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/373,239

(22) Filed: Apr. 2, 2019

(65) Prior Publication Data

US 2020/0053790 A1    Feb. 13, 2020

Related U.S. Application Data

(60) Provisional application No. 62/670,047, filed on May 11, 2018.

(30) Foreign Application Priority Data

| Apr. 2, 2018 | (KR) | 10-2018-0037987 |
| May 4, 2018 | (KR) | 10-2018-0052074 |
| May 10, 2018 | (KR) | 10-2018-0053972 |

(51) Int. Cl.
  *H04W 74/08* (2009.01)
  *H04W 74/00* (2009.01)
(52) U.S. Cl.
  CPC ..... *H04W 74/0833* (2013.01); *H04W 74/006* (2013.01); *H04W 74/008* (2013.01)

(58) Field of Classification Search
  CPC ........... H04W 74/0833; H04W 74/008; H04W 74/006
  See application file for complete search history.

(56) References Cited

U.S. PATENT DOCUMENTS

| 2014/0071930 A1 | 3/2014 | Lee et al. |
| 2015/0282215 A1 | 10/2015 | Eriksson et al. |

(Continued)

FOREIGN PATENT DOCUMENTS

KR    1020100019337    2/2010

OTHER PUBLICATIONS

Huawei, Introduction of Rel-14 NB-IoT enhancements in 36.212, 3GPP TSG RAN WG1 Meeting #88, Athens, Greece, Feb. 13-17, 2017, R1-1701785. (Year: 2017).*

(Continued)

*Primary Examiner* — Shailendra Kumar
(74) *Attorney, Agent, or Firm* — Fish & Richardson P.C.

(57) ABSTRACT

This specification provides a method for transmitting a random access preamble by a user equipment (UE) in a wireless communication system supporting a narrow band-Internet of things (NB-IoT). Specifically, the UE receives a downlink control channel (Physical Downlink Control Channel (PDCCH)) including downlink control information (DCI) from an eNB and the DCI includes an indicator indicating whether a preamble format of a random access preamble allocated to the UE is format 0/1 or format 2. Then, the UE transmits the random access preamble to the eNB in a subcarrier allocated to the UE according to the preamble format and receives a random access response from the eNB in response to the random access preamble.

12 Claims, 17 Drawing Sheets

(56) References Cited

U.S. PATENT DOCUMENTS

2016/0330766 A1* 11/2016 Liu .................. H04W 28/18
2018/0077696 A1* 3/2018 Lee .................. H04W 72/048
2018/0317182 A1* 11/2018 Yang ................ H04W 24/10
2019/0349985 A1* 11/2019 Lin .................. H04L 5/0053

OTHER PUBLICATIONS

LG Electronics, "Discussion on UL aspects in TDD NB-IoT," R1-1802990, 3GPP TSG RAN WG1 Meeting #92, Athens, Greece, Feb. 26-Mar. 2, 2018, 18 pages, XP051398369.

Qualcomm Incorporated, "NB-IoT RRC connection release enhancements," R2-1708620, 3GPP TSG RAN WG2 #99, Berlin, Germany, Aug. 21-25, 2017, 9 pages.

Huawei, HiSilicon, "DCI for NB-IoT," R1-161803, 3GPP TSG RAN WG1 NB-IoT Ad-Hoc Meeting #2, Sophia-Antipolis, France, France, Mar. 22-24, 2016, 9 pages.

Huawei, HiSilicon, "NPRACH enhancement for cell radius extension," R1-1801446, 3GPP TSG RAN WG1 Meeting #92, Athens, Greece, Feb. 26-Mar. 2, 2018, 9 pages.

LG Electronics, "Resource configuration for NPRACH enhancement," R1-1802176, 3GPP TSG RAN WG1 Meeting #92, Athens, Greece, Feb. 26-Mar. 2, 2018, 11 pages.

Huawei, "Introduction of Rel-14 NB-IoT enhancements in 36.212," R1-1701785, 3GPP TSG RAN WG1 Meeting #88, Athens, Greece, Feb. 13-17, 2017, 3 pages.

LG Electronics, "Preamble structure for NPRACH enhancement," R1-1802175, 3GPP TSG RAN WG1 Meeting #92, Athens, Greece, Feb. 26-Mar. 2, 2018, 4 pages.

Extended European Search Report in European Application No. 19166854.0, dated Jul. 2, 2019, 9 pages.

CATT, "Open issues on DCI contents and formats," R1-1801730, 3GPP TSG RAN WG1 Meeting #92, Athens, Greece, Feb. 26-Mar. 2, 2018, 6 pages.

Ericsson, "Remaining issues of the DCI contents and formats," R1-1802905, 3GPP TSG-RAN WG1 Meeting#92, Athens, Greece, Feb. 26-Mar. 2, 2018, 10 pages.

Huawei, HiSilicon, "Remaining issues on DCI contents and formats," R1-1801337, 3GPP TSG RAN WG1 Meeting#92, Athens, Greece, Feb. 26-Mar. 2, 2018, 6 pages.

Korean Notice of Allowance in Korean Appln. No. 10-2020-0029022, dated Sep. 7, 2020, 6 pages (with English translation).

\* cited by examiner

| E | T | RAPID | Oct1 |

(a)

| E | T | R | R | BI | Oct1 |

(b)

| R | Timing advance command | | Oct1 |
|---|---|---|---|
| Timing advance command | | UL Grant | Oct2 |
| UL Grant | | | Oct3 |
| UL Grant | | R | Oct4 |
| Temporary C-RNTI | | | Oct5 |
| Temporary C-RNTI | | | Oct6 |

(c)

METHOD AND APPARATUS FOR TRANSMITTING AND RECEIVING RANDOM ACCESS PREAMBLES IN A WIRELESS COMMUNICATION SYSTEM

CROSS-REFERENCE TO RELATED APPLICATIONS

This application priority to Provisional Application No. 10-2018-0037987 filed on 4 Apr. 2018 in KR, No. 10-2018-0052074 filed on 4 May 2018 in KR, No. 10-2018-0053972 filed on 10 May 2018 in KR, and No. 62/670,047 filed on 11 May 2018 in US the entire contents of which are hereby incorporated by reference in its entirety.

BACKGROUND OF THE INVENTION

Field of the Invention

The present invention relates to a method for transmitting and receiving a random access preamble in a wireless communication system, and more particularly, to a method for transmitting and receiving a random access preamble in a wireless communication system supporting NarrowBand-Internet of Things (NB-IoT) and an apparatus for supporting the same.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

This specification proposes a method for transmitting and receiving a random access preamble in a wireless communication system supporting NarrowBand-Internet of Things (NB-IoT).

Further, this specification proposes a method for transmitting and receiving an existing NPRACH preamble and an enhanced PRACH preamble when the enhanced PRACH preamble is supported in addition to the existing NPRACH preamble.

In addition, this specification proposes a method for distinguishing whether a preamble allocated to a UE is the existing NPRACH preamble or the enhanced PRACH preamble.

Further, this specification proposes a method for configuring a field of downlink control information (DCI) according to the NPRACH preamble allocated to the UE.

In addition, this specification proposes a method for determining the number of bits of a field for allocating a subcarrier index according to the NPRACH preamble allocated to the UE.

The technical objects of the present invention are not limited to the aforementioned technical objects, and other technical objects, which are not mentioned above, will be apparently appreciated by a person having ordinary skill in the art from the following description.

In this specification, a method for transmitting a random access preamble by a user equipment (UE) in a wireless communication system supporting a narrow band-Internet of things (NB-IoT) includes: receiving, from a base station, a Physical Downlink Control Channel (PDCCH) including Downlink Control Information (DCI), the DCI including an indication indicating whether a preamble format of the random access preamble allocated to the UE is format 0/1 or format 2; transmitting, to the base station, the random access preamble in a subcarrier allocated to the UE according to the preamble format; and receiving, from the base station, a random access response in response to the random access preamble.

In the present invention, when a value of the indication is '0', the preamble format is format 0/1, and when the value of the indicator is '1', the preamble format is format 2.

In the present invention, the DCI further includes a subcarrier indication as information associated with a subcarrier for transmitting the random access preamble.

In the present invention, when the preamble format indicates format 0/1, the bit number of the subcarrier indication is 6 bits, and when the preamble format indicates format 2, the bit number of the subcarrier indication is 8 bits.

When the maximum number of IDs of the random access preamble is $RAPID_{MAX}$, the bit number of the subcarrier indication is calculated through the following equation, $[\log_2(RAPID_{MAX})]$.

In the present invention, the bit number of the subcarrier indication is the same or increases when the value of a subcarrier spacing becomes smaller.

In the present invention, the DCI further includes a flag indicating a format of the DCI, start number information associated with a start number of repetition of a random access procedure, and a carrier indication associated with a carrier for transmitting the random access preamble.

In the present invention, the remaining bit number of the DCI is set to a value of 1.

In the present invention, a subcarrier spacing of the format 0/1 is 3.75 kHz and a subcarrier spacing of the format 2 is 1.25 kHz.

In the present invention, the maximum number of subcarriers allocated for the random access preamble in the format 0/1 is 48, and the maximum number of subcarriers allocated for the random access preamble in the format 2 is 144.

In the present invention, the method further includes receiving, from the base station, system information associated with the preamble format supported by the base station.

In this specification, a method for receiving a random access preamble by a base station in a wireless communication system supporting a narrow band-Internet of things (NB-IoT) includes: transmitting, to a UE, a Physical Downlink Control Channel (PDCCH) including Downlink Control Information (DCI), the DCI including an indicator indicating whether a preamble format of the random access preamble allocated to the UE is format 0/1 or format 2; receiving, from the UE, the random access preamble in a subcarrier allocated to the UE according to the preamble format; and transmitting, to the UE, a random access response in response to the random access preamble.

In this specification, a UE transmitting a random access preamble in a wireless communication system supporting a narrow band-Internet of things (NB-IoT) includes: a radio frequency (RF) module for transmitting and receiving a radio signal; and a processor functionally connected with the RF module, in which the processor is configured to receive, from a base station, a Physical Downlink Control Channel (PDCCH) including Downlink Control Information (DCI), the DCI including an indicator indicating whether a preamble format of the random access preamble allocated to the UE is format 0/1 or format 2, transmit, to the base station, the random access preamble in a subcarrier allocated to the UE according to the preamble format, and receive, from the base station, a random access response in response to the random access preamble.

According to an embodiment of the present invention, a UE can recognize whether a preamble allocated for a random access procedure is an existing random access preamble or an enhanced random access preamble.

Further, according to an embodiment of the present invention, it is possible to efficiently configure a subcarrier index for transmission of the existing random access preamble and the enhanced random access preamble.

Advantages which can be obtained in the present invention are not limited to the aforementioned effects and other unmentioned advantages will be clearly understood by those skilled in the art from the following description.

BRIEF DESCRIPTION OF THE DRAWINGS

The accompanying drawings, which are included herein as a part of the description for help understanding the present invention, provide embodiments of the present invention, and describe the technical features of the present invention with the description below.

DESCRIPTION OF EXEMPLARY EMBODIMENTS

Figure 1:
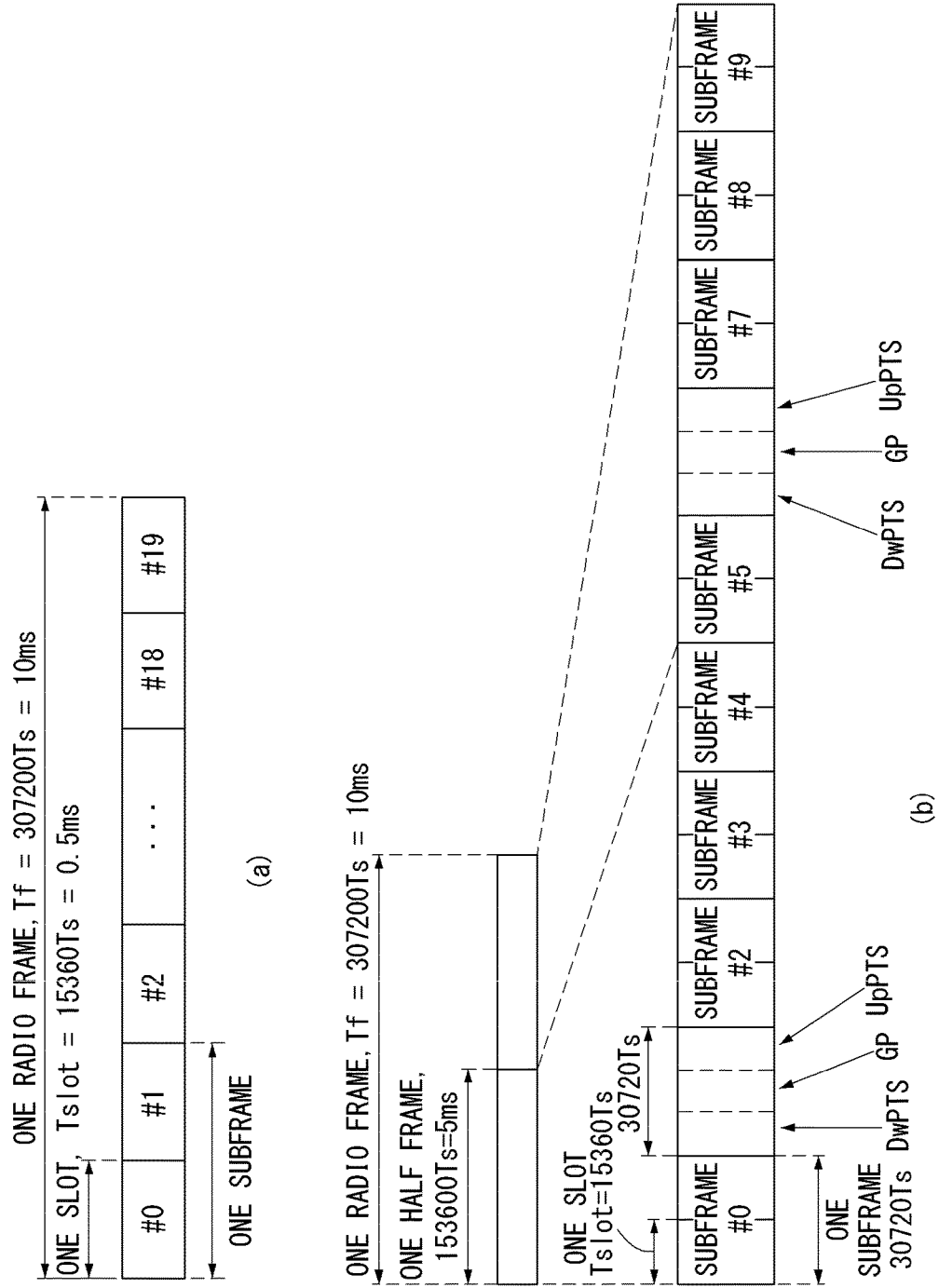
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), or), gNB (next generation NB, general NB, gNodeB). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Further, 5G new radio (NR) defines Enhanced Mobile Broadband (eMBB), Massive Machine Type Communications (mMTC), Ultra-Reliable and Low Latency Communications (URLLC), and vehicle-to-everything (V2X) according to a usage scenario.

In addition, the 5G NR standard is divided into standalone (SA) and non-standalone (NSA) depending on co-existence between the NR system and the LTE system.

In addition, the 5G NR supports various subcarrier spacings, and supports CP-OFDM in the downlink and CF-OFDM and DFT-s-OFDM (SC-OFDM) in the uplink.

Embodiments of the present invention may be supported by standard documents disclosed in at least one of wireless access systems IEEE 802, 3GPP, and 3GPP2. That is, steps or portions of the embodiments of the present invention which are not described in order to clearly illustrate the technical spirit of the present invention may be supported by the documents. Further, all terms disclosed in the document may be described by the standard document.

For clarity of description, 3GPP LTE/LTE-A/New RAT (NR) is mainly described, but the technical features of the present invention are not limited thereto.

Definition of Terms eLTE eNB: The eLTE eNB is the evolution of an eNB that supports connections to Evolved Packet Core (EPC) and Next Generation Core (NGC).

gNB: Node that supports the NR as well as connection to the NGC.

New RAN: Wireless access network that supports the E-UTRA or interacts with the NGC.

Network slice: The network slice is a network defined by an operator to provide an optimized solution for a specific market scenario that requires specific requirements with end-to-end coverage.

Network function: The network function is a logic node in a network infrastructure having a well defined external interface and a well defined functional operation.

NG-C: Control plane interface used for an NG reference point between new RAN and the NGC.

NG-U: User plane interface used for an NG3 reference point between the enhanced RAN and the NGC.

Non-standalone NR: Arrangement configuration in which gNB requests an LTE eNB as an anchor for EPC control plane connection or an eLTE eNB as the anchor for the control plane connection to the NGC.

Non-standalone E-UTRA: Arrangement configuration in which the eLTE eNB requires the gNB as the anchor for the control plane connection to the NGC.

User plane gateway: Endpoint of NG-U interface.

Numerology: Corresponds to one subcarrier spacing in a frequency domain. Different numerology may be defined by scaling reference subcarrier spacing to an integer N.

NR: NR Radio Access or New Radio

Overview of System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1($a$) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes contiguous two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1($b$) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

The structure of a radio subframe according to the example of FIG. 1 is just an example, and the number of subcarriers included in a radio frame, the number of slots included in a subframe and the number of OFDM symbols included in a slot may be changed in various manners.

Figure 2:
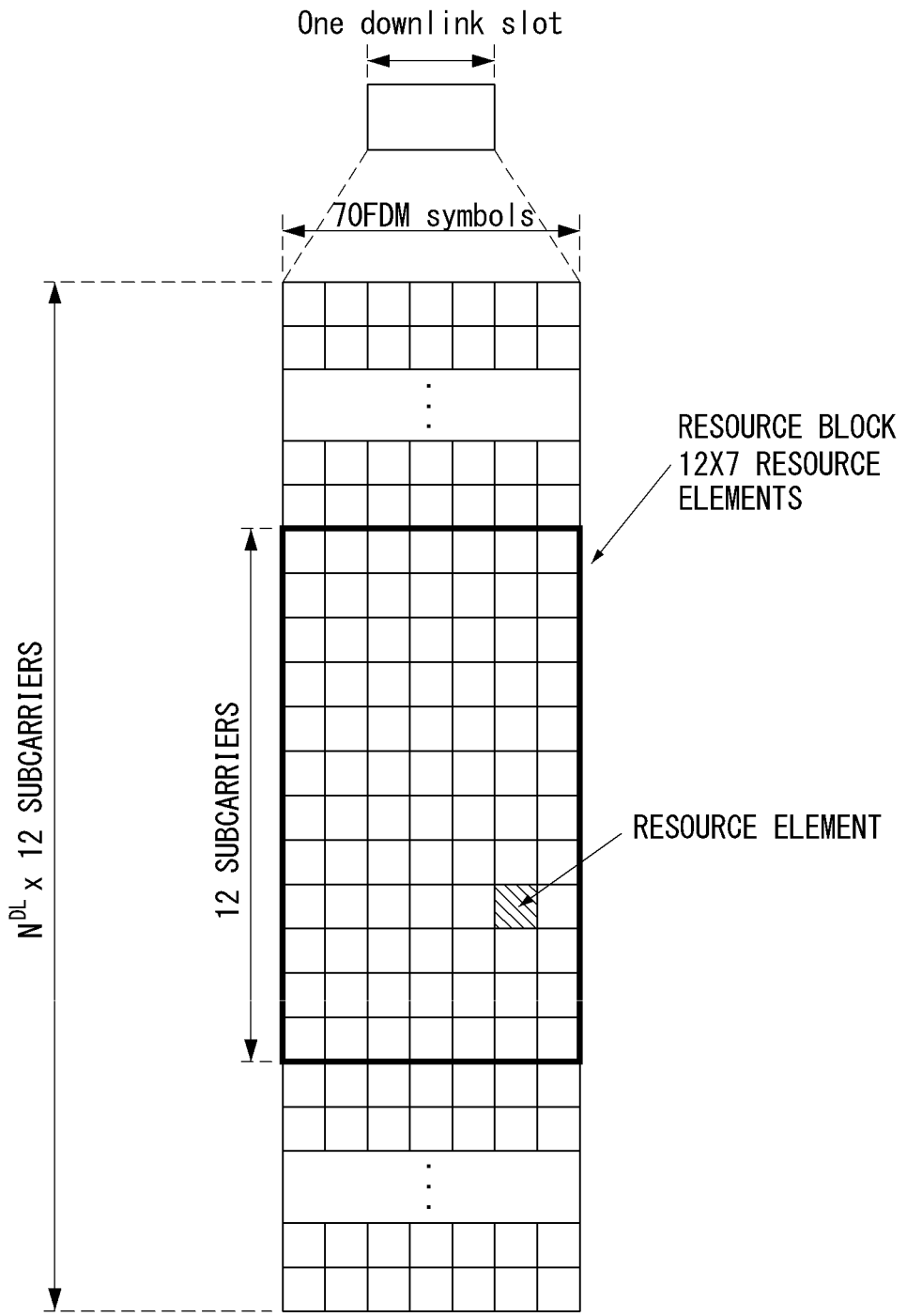
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12☐7 resource elements. The number of RBs NADL included in a downlink slot depends on a downlink transmission bandwidth.

The structure of an uplink slot may be the same as that of a downlink slot.

Figure 3:
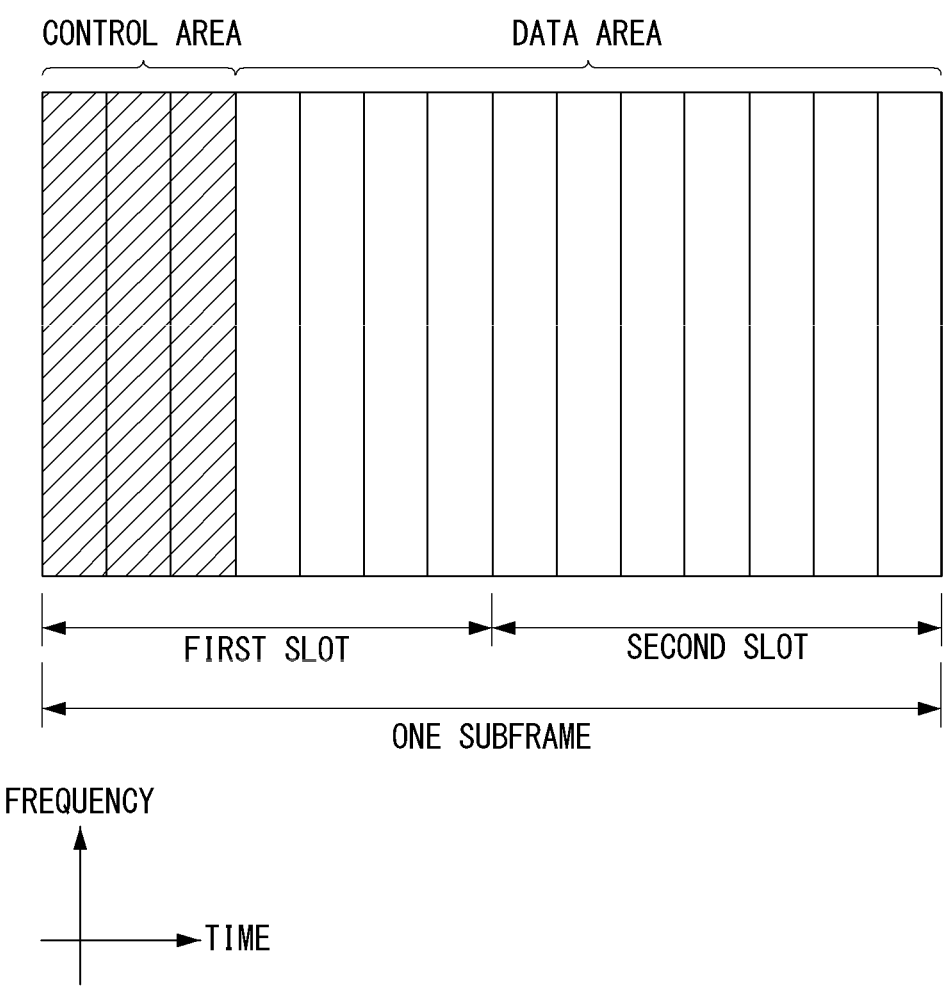
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. APDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

Figure 4:
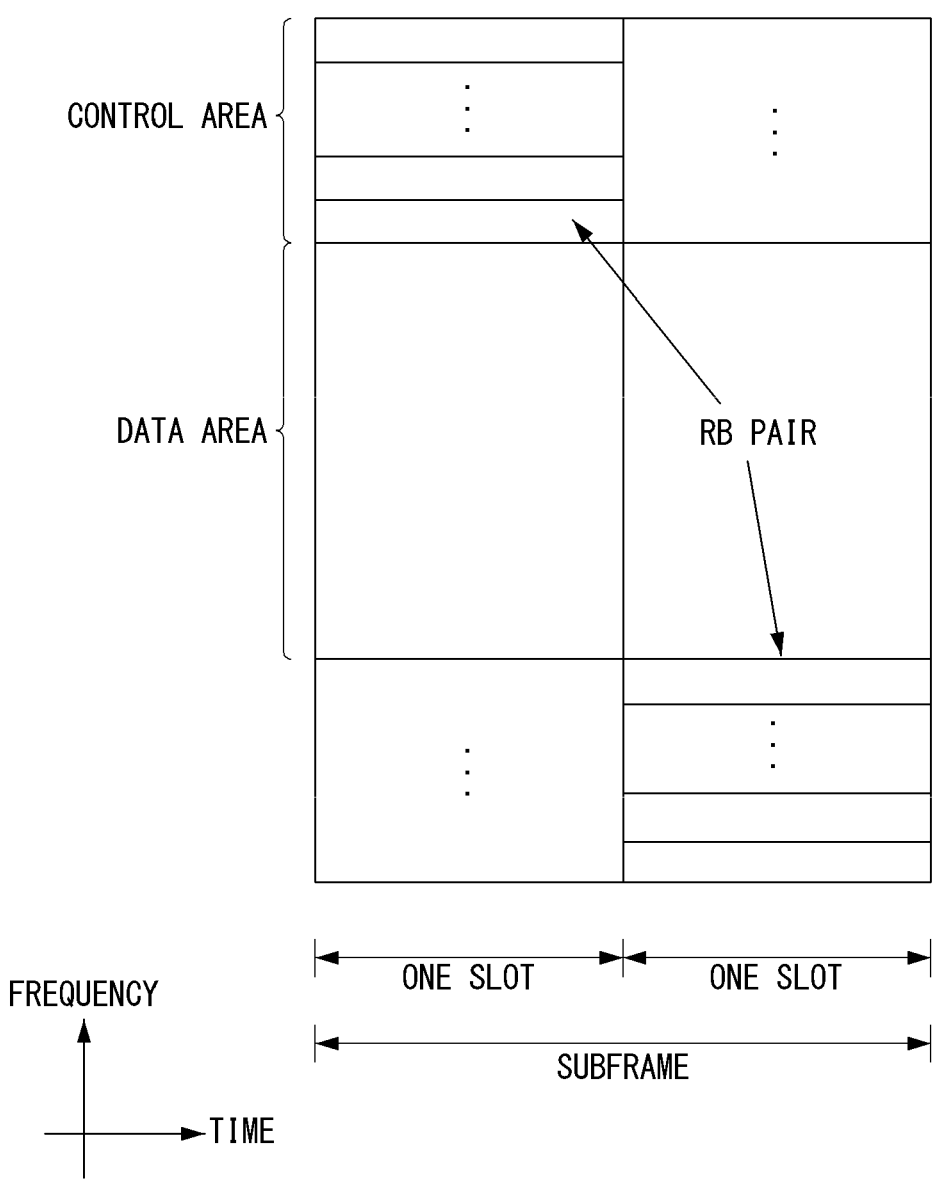
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC CONNECTED state, but does not have the configured carrier aggregation or does not support the carrier aggregation, only one serving constituted by only the P cell is present. On the contrary, in a terminal which is in the RRC CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 5:
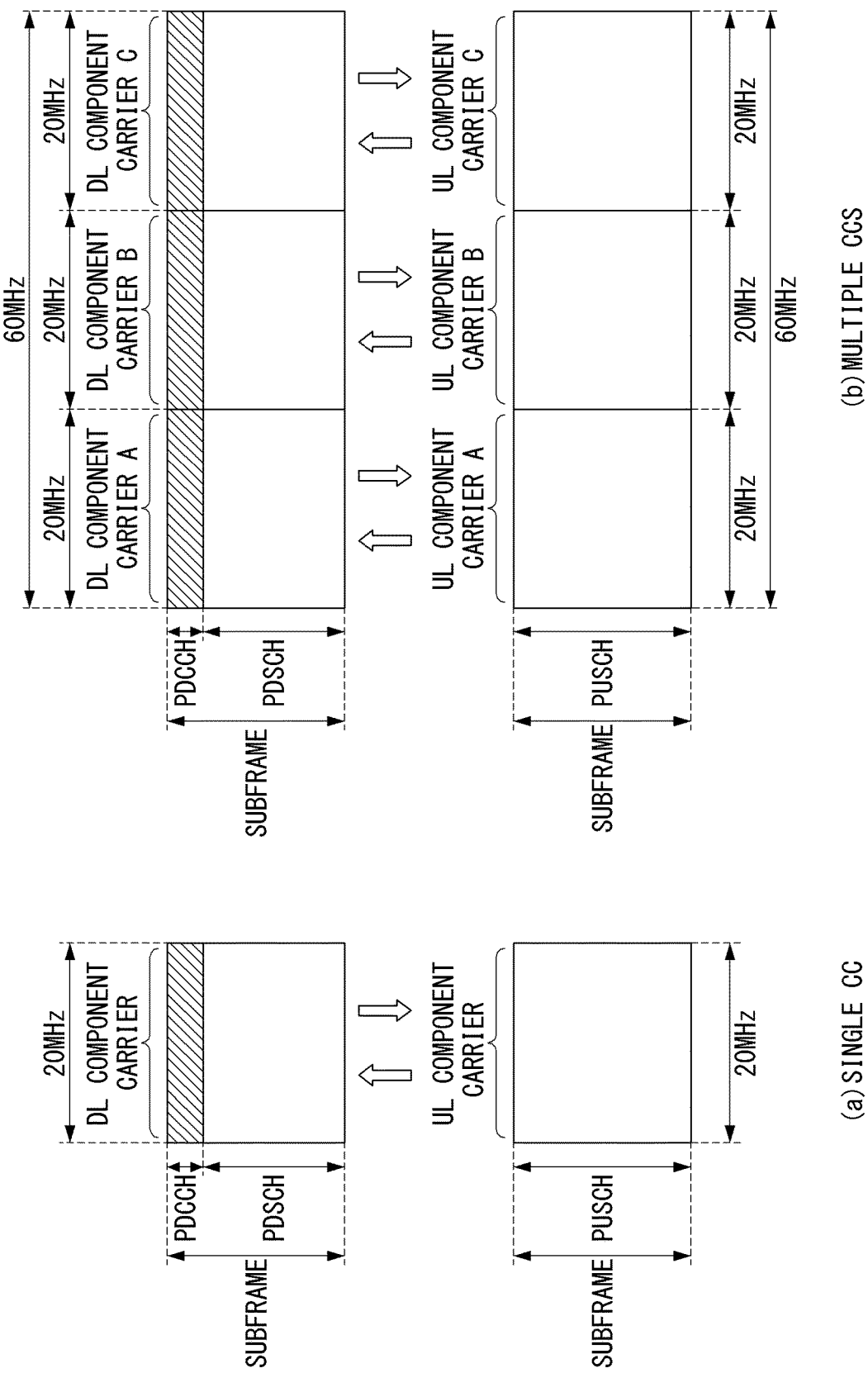
FIG. 5 illustrates examples of component carriers and carrier aggregation in a wireless communication system to which the present invention may be applied.

FIG. 5 illustrates examples of a component carrier and carrier aggregation in the wireless communication system to which the present invention can be applied.

FIG. 5a illustrates a single carrier structure used in an LTE system. The component carrier includes the DL CC and the UL CC. One component carrier may have a frequency range of 20 MHz.

FIG. 5b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 6:
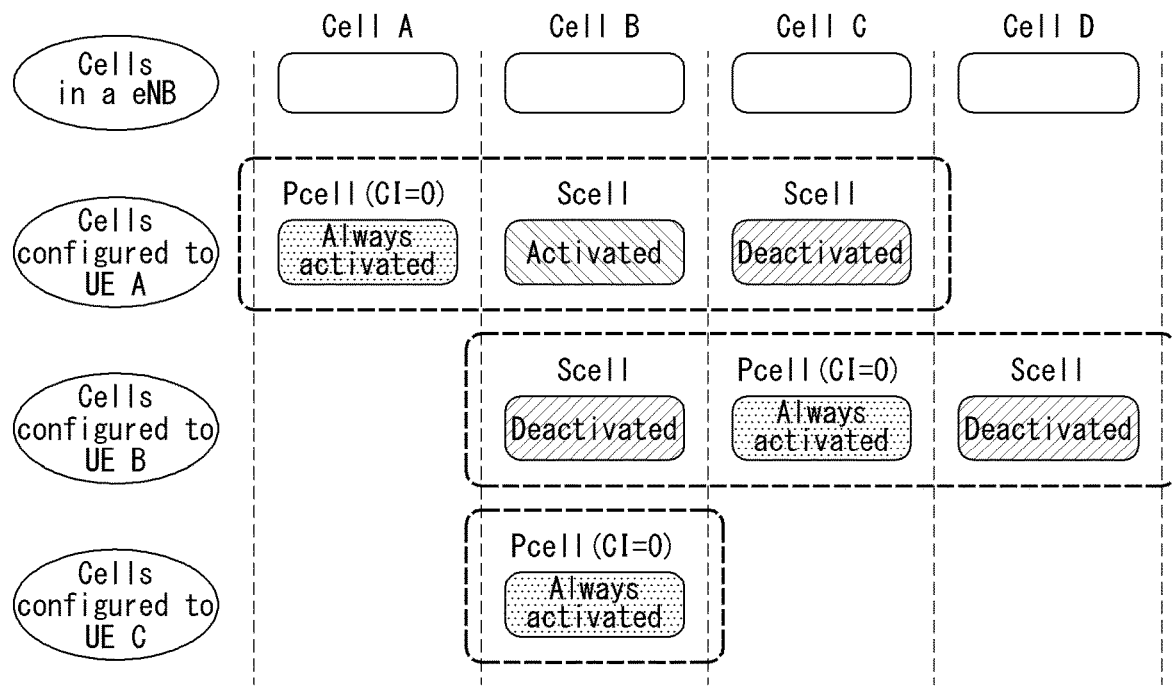
FIG. 6 is a diagram illustrating division of cells in a system that supports the carrier aggregation.

FIG. 6 is a diagram illustrating division of cells in a system that supports the carrier aggregation.

Referring to FIG. 6, a configured cell as a cell that may perform carrier aggregation based on a measurement report among cells of a base station as illustrated in FIG. 5 may be configured for each UE. The configured cell may reserve resources for ack/nack transmission for PDSCH transmission in advance. An activated cell as a cell configured to transmit a PDSCH/PUSCH among the configured cells performs Channel State Information (CSI) reporting and (Sounding Reference Signal (SRS) transmission for PDSCH/PUSCH transmission. A de-activated cell as a cell that prevents PDSCH/PUSCH transmission due to a command of the base station or a timer operation may also stop the CSI reporting and the SRS transmission.

Narrowband Physical Random Access Channel

Figure 7:
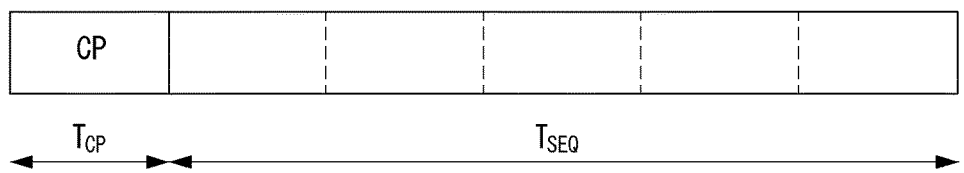
FIG. 7 is a diagram illustrating a random access symbol group.

FIG. 7 is a diagram illustrating a random access symbol group.

A physical layer random access preamble is based on a single subcarrier frequency hopping symbol group. As illustrated in FIG. 7, the symbol group is constituted by a cyclic prefix (CP) having a length of Tcp and a sequence of five identical symbols having a total length of TSEQ.

Table 3 shows an example of each parameter value for the preamble format.

TABLE 3

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

A preamble constituted by four symbol groups transmitted with no gap needs to be transmitted $N_{rep}^{NPRACH}$ times.

When triggered by an MAC layer, transmission of the random access preamble may be limited to a specific time and a frequency resource and an NPRACH configuration provided by an upper layer may include the following matters.

NPRACH resource period $N_{period}^{NPRACH}$ (nprach-Periodicity),

Frequency location of first subcarrier allocated to NPRACH $N_{scoffset}^{NPRACH}$ (nprach-SubcarrierOffset), Number of subcarriers allocated to NPRACH $N_{sc}^{NPRACH}$ (nprach-NumSubcarriers), Number of start subcarriers allocated to contention based NPRACH random access $N_{sc_{cont}}^{NPRACH}$ (nprach-NumCBRA-StartSubcarriers), Number of NPRACH repetitions per attempt $N_{rep}^{NPRACH}$ (numRepetitionsPerPreambleAttempt), Start time of NPRACH $N_{start}^{NPRACH}$ (nprach-StartTime), Ratio for calculating start subcarrier index for NPRACH subcarrier range reserved for displaying UE supporting multi-tone message 3 transmission $N_{MSG3}^{NPRACH}$ (nprach-SubcarrierMSG3-RangeStart).

NPRACH transmission may start only in $N_{start}^{NPRACH} \cdot 30720T_s$ time unit after a radio frame satisfying $n_f \bmod (N_{period}^{NPRACH}/10)=0$ starts.

A gap of $40 \cdot 30720T_s$ time unit may be inserted after transmission of $4 \cdot 64(T_{CP}+T_{SEQ})$ time unit and an NPRACH configuration which is $N_{scoffset}^{NPRACH}+N_{sc}^{NPRACH}>N_{sc}^{UL}$ may not be valid.

Start subcarriers of the NPRACH allocated to the contention based random access may be classified into two sets of subcarriers of $\{0,1, \ldots, N_{sc\_cont}^{NPRACH}N_{MSG3}^{NPRACH}-1\}$ and $\{N_{sc\_cont}^{NPRACH}N_{MSG3}^{NPRACH}, \ldots, N_{sc\_cont}^{NPRACH}-1\}$ and when a second set exists, the second set may indicate the UE supporting the multi-tone message 3 transmission.

The frequency location of the NPRACH transmission is limited within $N_{sc}^{RA}=12$ subcarriers and the frequency hopping is used within 12 subcarriers. Here, a frequency location of an i-th symbol group may be given by Equation 1 below.

$$n_{sc}^{RA}(i) = n_{start} + \tilde{n}_{SC}^{RA}(i) \quad \text{[Equation 1]}$$

$$n_{start} = N_{scoffset}^{NPRACH} + \lfloor n_{init}/N_{sc}^{RA} \rfloor \cdot N_{sc}^{RA}$$

$$\tilde{n}_{sc}^{RA}(i) =$$

$$\begin{cases} (\tilde{n}_{sc}^{RA}(0) + f(i/4)) & i \bmod 4 = 0 \text{ and } i > 0 \\ \bmod N_{sc}^{RA} & \\ \tilde{n}_{sc}^{RA}(i-1) + 1 & i \bmod 4 = 1, 3 \text{ and } \tilde{n}_{sc}^{RA}(i-1) \\ & \bmod 2 = 0 \\ \tilde{n}_{sc}^{RA}(i-1) - 1 & i \bmod 4 = 1, 3 \text{ and } \tilde{n}_{sc}^{RA}(i-1) \\ & \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n)2^{n-(10t+1)} \right) \bmod(N_{sc}^{RA}-1) + 1 \right)$$

$$\bmod N_{sc}^{RA}$$

$$f(-1) = 0$$

In Equation 1, $\tilde{n}_{SC}^{RA}(0)=n_{init} \bmod N_{sc}^{RA}$ with $n_{init}$ being the subcarrier selected by the MAC layer from $\{0,1, \ldots, N_{sc}^{NPRACH}-1\}$ and the pseudo random sequence generator shall be initialized with $c_{init}=N_{ID}^{Ncell}$.

Baseband Signal Generation

The time-continuous random access signal si(t) for symbol group i may be defined by Equation 2 below.

$$s_i(t) = \beta_{NPRACH} e^{j2\pi(n_{SC}^{RA}(i)+Kk_0+1/2)\Delta f_{RA}(t-T_{CP})} \quad \text{[Equation 2]}$$

In Equation, t has a range of $0 \leq t < T_{SEQ}+T_{CP}$ and $\beta_{NPRACH}$ represents an amplitude scaling factor in order to conform to the transmit power $P_{NPRACH}$ and $k_0=-N_{sc}^{UL}/2$, $k=\Delta f/\Delta f^{RA}$ accounts for the difference in subcarrier spacing between the random access preamble and uplink data transmission.

The location in the frequency domain controlled by the parameter $n_{SC}^{RA}(i)$ may be derived from the aforementioned method and the variable $\Delta f_{RA}$ may be given by Table 4 below.

TABLE 4

| Preamble format | $\Delta f_{RA}$ |
|---|---|
| 0, 1 | 3.75 kHz |

PUSCH-Config

The information element (IE) PUSCH-ConfigCommon may be used to specify the common PUSCH configuration and the reference signal configuration for PUSCH and PUCCH and the IE PUSCH-ConfigDedicated may be used to specify the UE specific PUSCH configuration.

Table 5 below shows an example of the PUSCH-Config configuration and Table 6 shows the definition of the parameter.

TABLE 5

```
TDD-PUSCH-UpPTS-r14 ::=    CHOICE {
    release                    NULL,
    setup                      SEQUENCE {
      symPUSCH-UpPTS-r14       ENUMERATED {sym1, sym2, sym3,
sym4, sym5, sym6}                                        OPTIONAL,
-- Need ON
      dmrs-LessUpPTS-r14       ENUMERATED {true}   OPTIONAL   --
```

TABLE 5-continued

```
Need OR
    }
}
```

TABLE 6 symPUSCH-UpPTS

Indicates the number of data symbols that configured for PUSCH transmission in UpPTS. Values sym2, sym3, sym4, sym5 and sym6 can be used for normal cyclic prefix and values sym1, sym2, sym3, sym4 and sym5 can be used for extended cyclic prefix, see TS 36.213 [23, 8.6.2] and TS36.211 [21, 5.3.4].

In the case of UpPTS, when, dmrsLess-UpPts is configured to true, mapping *starts* in symbol $l=N_{symb}^{UL}-symPUSCH\_UpPts$ in a second slot of a specific subframe, otherwise, the mapping starts in symbol $l=N_{symb}^{UL}-symPUSCH\_UpPts$ PRACH-Config IE PRACH-ConfigSM and IE PRACH-Config are used to specify the PRACH configuration in system information and mobility control information, respectively and the IEs of the PRACH-Config are shown in Table 7 below.

TABLE 7

```
--ASN1START
PRACH-ConfigSIB ::=                          SEQUENCE {
    rootSequenceIndex                            INTEGER (0..837),
    prach-ConfigInfo                         PRACH-ConfigInfo
}
PRACH-ConfigSIB-v1310 ::=                    SEQUENCE {
    rsrp-ThresholdsPrachInfoList-r13             RSRP-
ThresholdsPrachInfoList-r13,
    mpdcch-startSF-CSS-RA-r13                CHOICE {
        fdd-r13                          ENUMERATED  {v1,  v1dot5,  v2,
v2dot5, v4, v5, v8, v10},
        tdd-r13                          ENUMERATED {v1, v2, v4, v5, v8,
v10, v20, spare}
    }
        OPTIONAL,   -- Cond MP
    prach-HoppingOffset-r13                  INTEGER (0..94)
        OPTIONAL,   -- Need OR
    prach-ParametersListCE-r13                   PRACH-ParametersListCE-r13
}
PRACH-Config ::=                             SEQUENCE {
    rootSequenceIndex                            INTEGER (0..837),
    prach-ConfigInfo                         PRACH-ConfigInfo
        OPTIONAL   -- Need ON
}
PRACH-Config-v1310 ::=                       SEQUENCE {
    rsrp-ThresholdsPrachInfoList-r13             RSRP-ThresholdsPrachInfoList-
r13          OPTIONAL, -- Cond MP
    mpdcch-startSF-CSS-RA-r13                CHOICE {
        fdd-r13                          ENUMERATED {v1, v1dot5, v2, v2dot5,
v4, v5, v8, v10},
        tdd-r13                          ENUMERATED {v1, v2, v4, v5, v8, v10,
v20, spare}
    }                                            OPTIONAL,   --
Cond MP
    prach-HoppingOffset-r13                  INTEGER (0..94)
        OPTIONAL,   -- Need OR
    prach-ParametersListCE-r13                   PRACH-ParametersListCE-r13
        OPTIONAL,   -- Cond MP
    initial-CE-level-r13                     INTEGER             (0..3)
        OPTIONAL   -- Need OR
}
PRACH-Config-v1430 ::=                       SEQUENCE {
    rootSequenceIndexHighSpeed-r14               INTEGER
(0..837),
    zeroCorrelationZoneConfigHighSpeed-r14       INTEGER (0.. 12),
    prach-ConfigIndexHighSpeed-r14               INTEGER (0..63),
    prach-FreqOffsetHighSpeed-r14                INTEGER (0..94)
}
```

TABLE 7-continued

```
PRACH-ConfigSCell-r10 ::=                SEQUENCE {
    prach-ConfigIndex-r10                INTEGER (0..63)
}
PRACH-ConfigInfo ::=                     SEQUENCE {
    prach-ConfigIndex                    INTEGER (0..63),
    highSpeedFlag                        BOOLEAN,
    zeroCorrelationZoneConfig            INTEGER (0..15),
    prach-FreqOffset                     INTEGER (0..94)
}
PRACH-ParametersListCE-r13 ::=           SEQUENCE (SIZE(1..maxCE-Level-r13))
OF PRACH-ParametersCE-r13
PRACH-ParametersCE-r13 ::=               SEQUENCE {
    prach-ConfigIndex-r13                INTEGER (0..63),
    prach-FreqOffset-r13                 INTEGER (0..94),
    prach-StartingSubframe-r13           ENUMERATED {sf2, sf4, sf8,
sf16, sf32, sf64, sf128,
                                                     sf256}
    OPTIONAL,  -- Need OP
    maxNumPreambleAttemptCE-r13
                    ENUMERATED {n3, n4, n5, n6, n7, n8, n10}
    OPTIONAL,  -- Need OP
    numRepetitionPerPreambleAttempt-r13  ENUMERATED
{n1,n2,n4,n8,n16,n32,n64,n128},
    mpdcch-NarrowbandsToMonitor-r13      SEQUENCE
(SIZE(1..2)) OF
                                         INTEGER
(1..maxAvailNarrowBands-r13),
    mpdcch-NumRepetition-RA-r13          ENUMERATED {r1, r2, r4, r8,
r16,
                                                     r32, r64, r128, r256},
    prach-HoppingConfig-r13              ENUMERATED {on,off}
}
RSRP-ThresholdsPrachInfoList-r13 ::= SEQUENCE (SIZE(1..3)) OF RSRP-Range
--ASN1STOP
```

Table 8 shows the definition of each parameter in Table 7.

TABLE 8

| PRACH-Config field descriptions |
|---|
| initial- CE-level |
| Indicates initial PRACH CE level at random access, see TS 36.321 [6]. If not configured, UE selects PRACH CE level based on measured RSRP level, see TS 36.321 [6]. |
| highSpeedFlag |
| Parameter: High-speed-flag, see TS 36.211 [21, 5.7.2]. TRUE corresponds to Restricted set and FALSE to Unrestricted set. |
| maxNumPreambleAttemptCE |
| Maximum number of preamble transmission attempts per CE level. See TS 36.321 [6]. If the field is absent, the UE shall use the default value n3. |
| mpdcch-Narrowbands ToMonitor |
| Narrowbands to monitor for MPDCCH for RAR, see TS 36.213 [23, 6.2]. Field values (1 . . . maxAvailNarrowBands-r13) correspond to narrowband indices (0 . . . maxAvailNarrowBands-r13-1]) as specified in TS 36.211 [21]. |
| mpdcch-NumRepetition-RA |
| Maximum number of repetitions for MPDCCH common search space (CSS) for RAR, Msg3 and Msg4, see TS 36.211 [21]. |
| mpdcch-startSF-CSS-RA |
| Starting subframe configuration for MPDCCH common search space (CSS), including RAR, Msg3 retransmission, PDSCH with contention resolution and PDSCH with CCCH MAC SDU, see TS 36.211 [21] and TS 36.213 [23]. Value v1 corresponds to 1, value v1dot5 corresponds to 1.5, and so on. |
| numRepetitionPerPreambleAttempt |
| Number of PRACH repetitions per attempt for each CE level, See TS 36.211 [21]. |
| prach-ConfigIndex |
| Parameter: prach-ConfigurationIndex, see TS 36.211 [21, 5.7.1]. |
| prach-ConfigIndexHighSpeed |
| Parameter: prach-ConfigurationIndexHighSpeed, see TS 36.211 [21, 5.7.1]. If this field is present, the UE shall ignore prach-ConfigIndex. |

TABLE 8-continued

PRACH-Config field descriptions prach-FreqOffset

Parameter: prach-FrequencyOffset, see TS 36.211 [21, 5.7.1]. For TDD the value range is dependent on the value of prach-ConfigIndex.
prach-FreqOffsetHighSpeed Parameter: prach-FrequencyOffsetHighSpeed, see TS 36.211 [21, 5.7.1]. For TDD the value range is dependent on the value of prach-ConfigIndexHighSpeed. If this field is present, the UE shall ignore prach-FreqOffset.
prach-HoppingConfig Coverage level specific frequency hopping configuration for PRACH.
prach-HoppingOffset
Parameter: PRACH frequency hopping offset, expressed as a number of resource blocks, see TS 36.211 [21, 5.7.1]
prach-ParametersListCE Configures PRACH parameters for each CE level. The first entry in the list is the PRACH parameters of CE level 0, the second entry in the list is the PRACH parameters of CE level 1, and so on.
prach-StartingSubframe PRACH starting subframe periodicity, expressed in number of subframes available for preamble transmission (PRACH opportunities), see TS 36.211 [21]. Value sf2 corresponds to 2 subframes, sf4 corresponds to 4 subframes and so on. EUTRAN configures the PRACH starting subframe periodicity larger than or equal to the number of PRACH repetitions per attempt for each CE level (numRepetitionPerPreambleAttempt).
If the field is absent, the value is determined implicitly in TS 36.211 [21, 5.7.1].
rootSequenceIndex Parameter: RACH_ROOT_SEQUENCE, see TS 36.211 [21, 5.7.1].
rootSequenceIndexHighSpeed The field indicates starting logical root sequence index used to derive the 64 random access preambles based on restricted set type B in high speed scenario, see TS 36.211 [21, 5.7.2]. If this field is present, the UE shall generate random access preambles based on restricted set type B and ignore rootSequenceIndex.
rsrp-ThresholdsPrachInfoList The criterion for BL UEs and UEs in CE to select PRACH resource set. Up to 3 RSRP threshold values are signalled to determine the CE level for PRACH, see TS 36.213 [23]. The first element corresponds to RSRP threshold 1, the second element corresponds to RSRP threshold 2 and so on, see TS 36.321 [6]. The UE shall ignore this field if only one CE level, i.e. CE level 0, is configured in prach-ParametersListCE. The number of RSRP thresholds present in rsrp-ThresholdsPrachInfoList is equal to the number of CE levels configured in prach-ParametersListCE minus one.
zeroCorrelationZoneConfig Parameter: $N_{CS}$ configuration, see TS 36.211 [21, 5.7.2: table 5.7.2-2] for preamble format 0 . . . 3 and TS 36.211 [21, 5.7.2: table 5.7.2-3] for preamble format 4.
zeroCorrelationZoneConfigHighSpeed The field indicates $N_{CS}$ configuration for the restricted set type B in high speed scenario, see TS 36.211 [21, 5.7.2]. If this field is present, the UE shall generate random access preambles based on restricted set type B and ignore zeroCorrelationZoneConfig.

Narrowband (NB)-LTE refers to a system for supporting low complexity and low power consumption with a system bandwidth (system BW) corresponding to 1. Physical Resource Block (PRB) of LTE system.

That is, the NB-LTE system may be primarily used as a communication mode for implementing the internet of things (IoT) by supporting a device (or UE) such as machine-type communication (MTC) in a cellular system. That is, the NB-LTE system may also be referred to as NB-IoT.

Further, the NB-IoT system does not need to allocate an additional band for the NB-IoT system by using the same OFDM parameters such as the subcarrier spacing used in the existing LTE system, as the LTE system. In this case, 1 PRB of the legacy LTE system band is allocated for the NB-IoT, which is advantageous in using the frequency efficiently.

The physical channel of the NB-IoT system may be defined as N-Primary Synchronization Signal (N-P SS), N-Secondary Synchronization Signal (N-S SS), N-Physical Channel (N-PBCH), N-PDCCH/N-EPDCCH, N-PDSCH, or the like in the case of downlink. Here, 'N-' may be used for distinguishing from the legacy LTE.

In the case of the NB-IoT system, the UE may transmit NPRACH (N-PRACH) in a single-tone transmission scheme.

Figure 8:
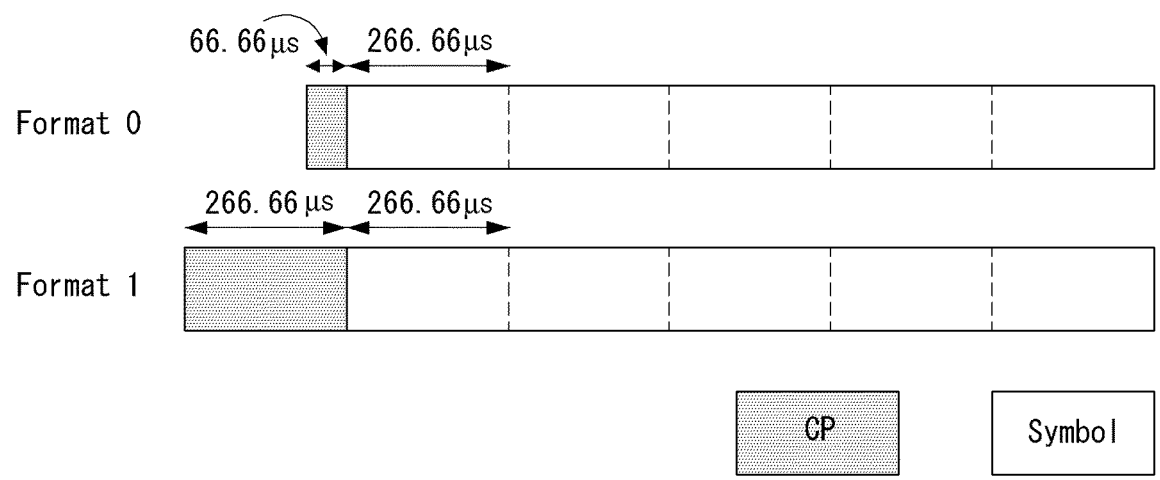
FIG. 8 is a diagram illustrating an NPRACH (N-PRACH) preamble format.

FIG. 8 is a diagram illustrating an NPRACH (N-PRACH) preamble format.

As illustrated in FIG. 8, the existing FDD NB-IoT uses NPRACH preambles of two formats.

Specifically, the existing NPRACH preamble is subjected to single tone transmission and has a subcarrier spacing of 3.75 kHz.

The NPRACH preamble may be configured by one symbol group by combining five symbols and one CP and the length of the CP is different according to the format type.

That is, format 0 is constituted by a CP of 66.66 us and five consecutive symbols of 266.66 us, and as a result, the symbol length becomes 1.4 ms, and format 1 is constituted by a CP of 266.66 us and five consecutive symbols of 266.66 us, and as a result, the symbol length becomes 1.6 ms.

Since a basic unit for repetitive transmission of the NPRACH preamble is formed by collecting four symbol groups, the length of four consecutive symbol groups constituting a single repetition is 5.6 ms when using format 0 and 6.4 ms when using format 1.

Figure 9:
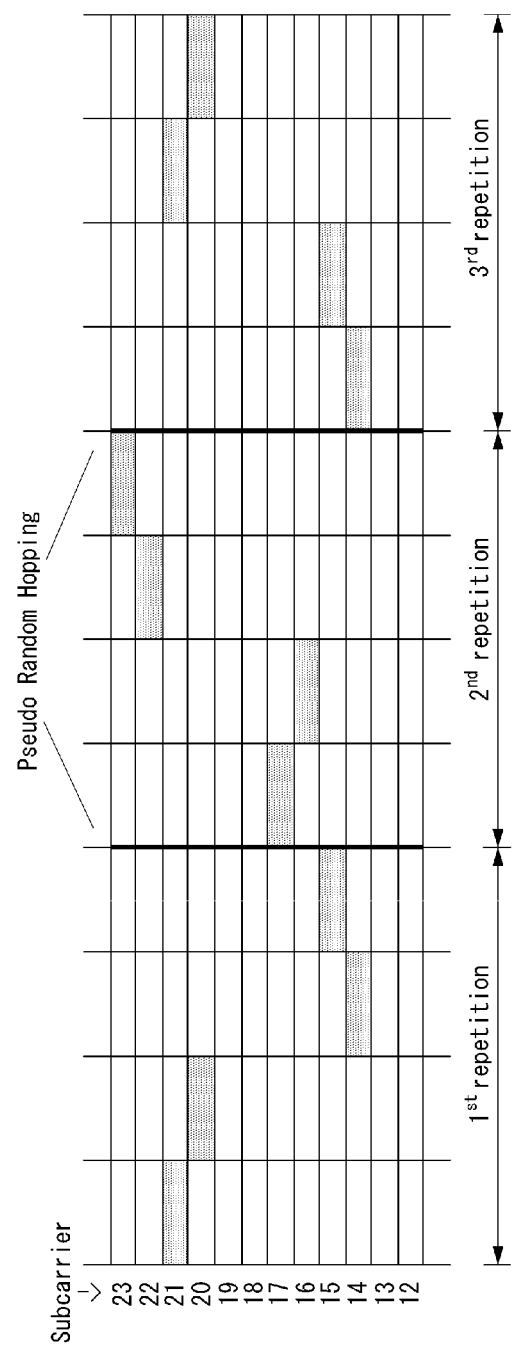
FIG. 9 is a diagram illustrating an example of hopping and spacing of an NPRACH preamble.

FIG. 9 is a diagram illustrating an example of hopping and spacing of an NPRACH preamble.

As illustrated in FIG. 9, the NPRACH preamble may have two hopping patterns. That is, a first hopping pattern in which the NPRACH is hopped with an interval of the subcarrier interval and a second hopping pattern in which the NPRACH is hopped with an interval of 6 times the subcarrier interval.

Hereinafter, this specification proposes a method for configuring a preamble which may be newly introduced in addition to the existing NPRACH preamble and operations of the eNB and the UE associated therewith.

Since there is a limit in transmission range by the existing PRACH preamble (hereinafter, legacy preamble), an enhanced format preamble needs to be defined in addition to the legacy preamble for extending the transmission range of the preamble.

Such an enhanced format preamble may have a subcarrier spacing of a smaller value than the legacy preamble.

For example, the subcarrier spacing of the legacy preamble having format 0/1 is 3.75 kHz as described above. However, a preamble having an enhanced format may have a subcarrier spacing of 1.25 kHz smaller than 3.75 kHz.

Since the legacy PREACH preamble is subjected to 3.75 kHz single tone transmission, a maximum of 48 subcarriers may be used for a single carrier (1 RB, 180 kHz) and 48 RAPIDs of 0 to 47 may be used according to the number of usable subcarriers.

However, since the subcarrier spacing of the enhanced format PRACH preamble is smaller than 3.75 kHz, the maximum number of subcarriers usable in the single carrier, and as a result, the number of RAPIDs need to also increase.

When the enhanced preamble format is introduced as described above, a scheme different from the existing methods may be used and this specification proposes a method for efficiently configuring a subcarrier index associated with a subcarrier index (e.g., preamble index and RAPID of RAN2) for introducing the enhanced preamble format.

Hereinafter, the present invention may be extended to various cases in which the subcarrier index needs to be changed with introduction of the enhanced preamble format and is described by considering a TDD in-band mode or guard band mode, but it is apparent that the present invention may be adopted even in a standalone mode.

Figure 10:
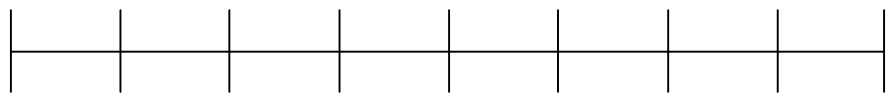
FIG. 10 is a diagram illustrating an example of an MAC (random access response (RAR).
Figure 10:

FIG. 10 is a diagram illustrating an example of an MAC (random access response (RAR).

FIG. 10(*a*) illustrates an example of an E/T/RAPID MAC sub-header of NB-IoT and FIG. 10(*b*) illustrates an example of an E/T/RR/BI MAC sub-header of NB-IoT. FIG. 10(*c*) illustrates an example of the MAC RAR of NB-IoT.

As described above, since the subcarrier spacing of the enhanced preamble is smaller than 3.75 kHz, the number of usable RAPIDs which is larger than 48 in the related art may also be used.

However, when the size of the E/T/RAPID MAC is not changed, 6 bits are used for the RAPID, and as a result, only up to a maximum of 64 RAPIDs are usable.

Hereinafter, a method for allocating the subcarrier index (or RAPID) for the enhanced preamble will be described.

Case of Sharing NPRACH Resource for Legacy Preamble

Hereinafter, the embodiment described a method for allocating the index of the subcarrier for transmitting the enhanced preamble in the case of sharing the NPRACH resource of a preamble (hereinafter, referred to as new preamble) of an enhanced format (hereinafter, referred to as format 2) with the NPRACH of the legacy preamble.

In the case of sharing the resource configured for the legacy preamble, the resource for transmitting the enhanced preamble is not separately allocated, and as a result, the existing resource needs to be used together with the legacy preamble.

Accordingly, 16 RAPIDs of 48 to 63 may be used for the enhanced preamble except for the RAPIDs of 0 to 47 for the existing preamble among a maximum of 64 RAPIDs usable in the related art.

Hereinafter, a specific embodiment for using 16 RAPIDs for transmitting the enhanced preamble will be described.

Embodiment 1

Figure 11:
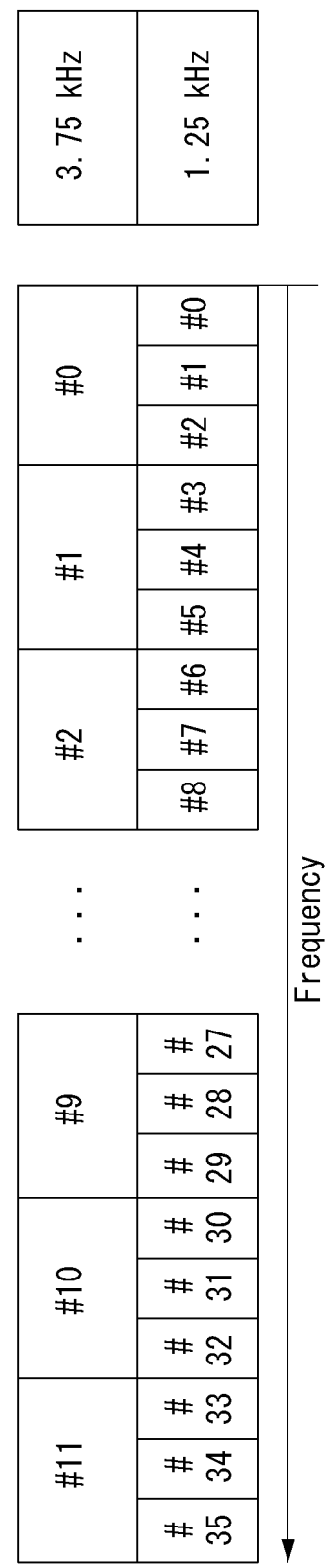
FIG. 11 is a diagram illustrating an example of a subcarrier index for preamble transmission to which a method proposed by this specification may be applied.

FIG. 11 is a diagram illustrating an example of a subcarrier index for preamble transmission to which a method proposed by this specification may be applied.

Referring to FIG. 11, the resource for transmitting the enhanced preamble may be configured to overlap with the resource for transmitting the legacy preamble on the frequency.

When 16 RAPIDs (e.g., 48 to 63) are used for the enhanced preamble, the start subcarrier index may be configured according to a predetermined specific rule.

That is, the index of the start subcarrier for transmitting the enhanced preamble may be configured according to the predetermined rule and indexes of the remaining subcarriers for transmitting the enhanced remaining preambles may be configured based on the configured start subcarrier index.

In this case, the predetermined rule may be configured such a manner that the location of the start subcarrier is used by a specific value by considering inter carrier interference.

In the embodiment, a basic unit of an NPRACH resource boundary for the enhanced preamble needs to be equal to that of the NPRACH resource boundary for the legacy preamble, 45 kHz may be maintained as the basic unit.

That is, in the case of the legacy preamble, since the subcarrier spacing is 3.75 kHz, the basic unit of the resource boundary becomes 45 kHz (3.75 kHz*12). Accordingly, the number of tones may be determined in order to fit the basic unit of the resource boundary to 45 kHz even for the enhanced preamble.

For example, when the subcarrier spacing of the enhanced preamble is 1.25 kHz, 36 tones may be used so the basic unit of the resource boundary becomes 45 kHz (1.25 kHz*36=45 kHz).

Since the RAPID for the enhanced preamble shares the resource with the legacy preamble, only 16 RAPIDs may be used and a region of an NPRACH resource for the enhanced preamble may not be more than 45 kHz.

When such features are reflected, a predetermined RAPID rule may be shown in Equation 3 below.

$$48 + \text{floor}(SC_{EP}/3) \qquad \text{[Equation 3]}$$

In Equation 2, SCEP means the subcarrier index used for transmitting the enhanced preamble.

Additionally, the RAPID of the enhanced preamble may be configured by adding a cell specific configured offset.

For example, when the cell specific configured offset is SCEP, offset, the RAPID may be configured by Equation 4 below.

$$48+\text{floor}\{(SC_{EP}+SC_{EP,offset})/3\} \quad [\text{Equation 4}]$$

Even though a cell specific offset value is configured to overlap with the NPRACH resource for the legacy preamble on the frequency axis, the cell specific offset value may have a value of 0 or 2 so that the enhanced preamble may operate.

That is, when the cell specific offset value has the value of '1', the cell specific offset value invades a place occupied by the legacy preamble, it may be configured that the cell specific offset value adopts only 0 or 2.

Table 9 below shows an example of an RAPID of the enhanced preamble depending on the cell specific offset value.

TABLE 9

| SCEP + SCEP, offset | RAPID = 48 + floor {(SCEP + SCEP, offset)/3} |
|---|---|
| 0 or 2 | 48 |
| 3 or 5 | 49 |
| 6 or 8 | 50 |
| 9 or 11 | 51 |
| 12 or 14 | 52 |
| 15 or 17 | 53 |
| 18 or 20 | 54 |
| 21 or 23 | 55 |
| 24 or 26 | 56 |
| 27 or 29 | 57 |
| 30 or 32 | 58 |
| 33 or 35 | 59 |

In Table 9, a value of SCEP+SCEP, offset may be a result value of applying modular 36 to an index of an actually selected subcarrier.

Figure 12:
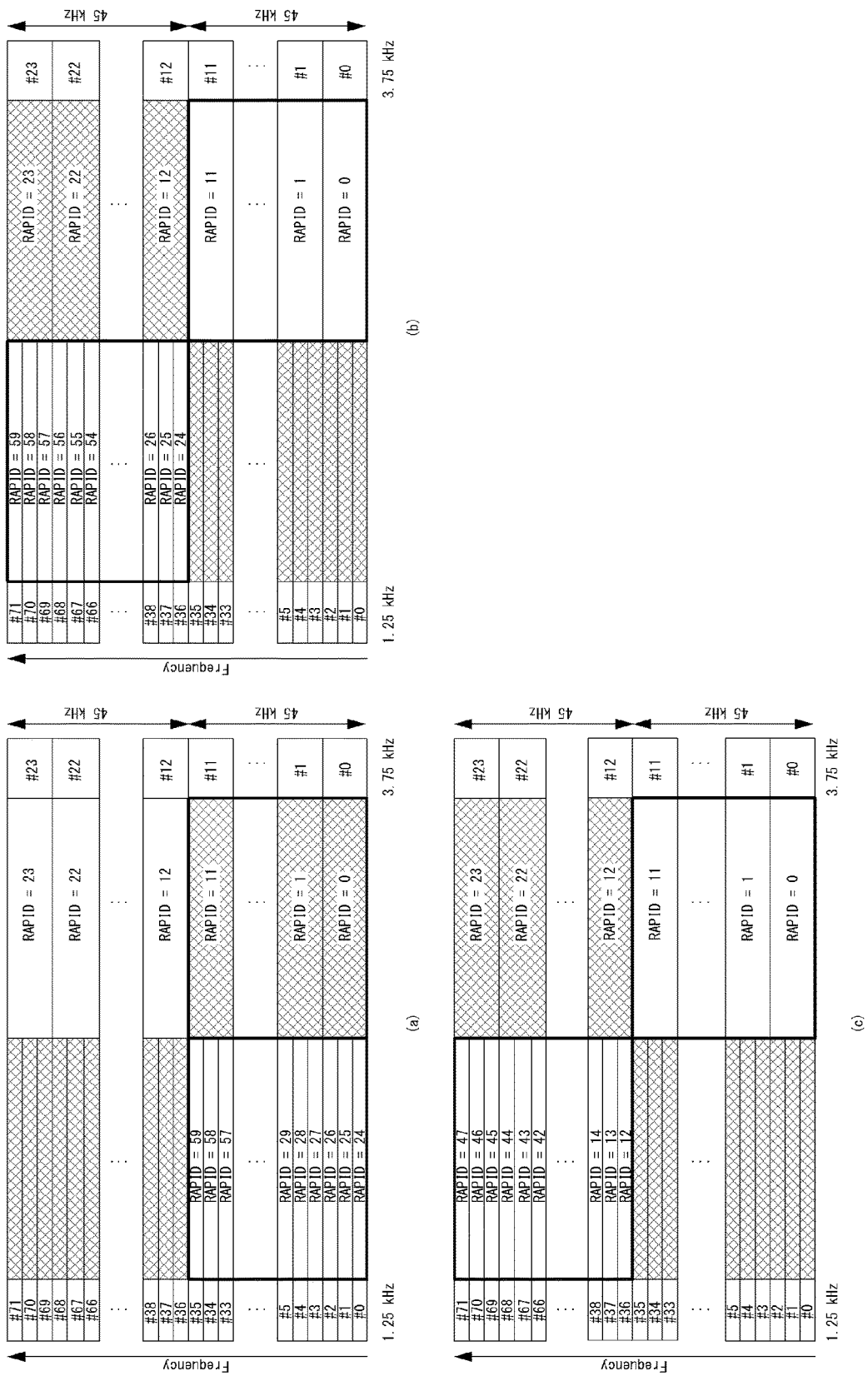
FIG. 12 is a diagram illustrating another example of the subcarrier index for preamble transmission to which the method proposed by this specification may be applied.

FIG. 12 is a diagram illustrating still yet another example of the subcarrier index for preamble transmission to which the method proposed by this specification may be applied.

Referring to FIG. 12, the index (or RAPID) of the subcarrier for transmitting the enhanced preamble may be differently configured according to the configuration of the resource region.

Specifically, it is described as an example that the RAPID of the legacy preamble for the legacy UE is set from 0 to 47, but the RAPID of the enhanced preamble may be determined according to the number of the resource region configured through the legacy System Information Block (SIB).

That is, when the resource for the legacy NPRACH is configured to one of {n12, n24, n36, n48}, the RAPID for the enhanced preamble may be configured like {12 to 63, 24 to 63, 36 to 63, 48 to 63}.

In other words, depending on the configured resource region, 52, 40, 28 or one of 16 RAPIDs may be selected and applied for one new preamble and the region of the NPRACH resource for the enhanced preamble can be set to a value greater than 45 kHz.

Further, the RAPID may be configured every one subcarrier index based on 1.25 kHz and even though one RAPID is configured in an actually configured resource region, when the set total number of RAPIDs is smaller than a maximum number, the remaining region may be configured as reserved.

In this case, the location of the subcarrier in which the enhanced preamble is transmitted may be determined according to a value configured by SIB and the RAPID may be independently configured.

For example, when the resource region allocated for the legacy NPRACH is 24 subcarriers (i.e., n24 is configured) and the resource region for the enhanced preamble is configured as #0 to #11 based on the legacy subcarrier index (from #0 to #35 based on the enhanced preamble), the RAPID of the enhanced preamble may be configured so that 24 to 59 are used as illustrated in FIG. 12(a).

As another example, when the resource region allocated for the legacy NPRACH is 24 subcarriers (i.e., n24 is configured) and the resource region for the enhanced preamble is configured as #12 to #23 based on the legacy subcarrier index (from #36 to #71 based on the enhanced preamble), the RAPID of the enhanced preamble may be configured so that 24 to 59 are used as illustrated in FIG. 12(b).

The methods illustrated in FIGS. 12(a) and 12(b) may be applied even to a case where the NPRACH resource of the enhanced preamble is not shared with the NPRACH resource.

Unlike FIG. 12(b), the resource for the legacy NPRACH is may be configured to one of {n12, n24, n36, n48} and the resource for transmitting the enhanced preamble may be configured to the subcarrier having the largest index based on the subcarrier index among the resources configured for the legacy NPRACH.

In this case, as illustrated in FIG. 12(c), the RAPID for the enhanced preamble may adopt a part of the RAPID of the legacy preamble.

That is, when the resource region allocated for the legacy NPRACH is 24 subcarriers (i.e., n24 is configured) and the resource region for the enhanced preamble is configured as #12 to #23 based on the legacy subcarrier index (from #36 to #71 based on the enhanced preamble), the subcarrier for the enhanced preamble may be allocated to a subcarrier having a largest index value among the subcarriers capable of transmitting the legacy preamble.

In this case, the UE that transmits the enhanced preamble may recognize that the UEs transmitting the legacy preamble do not transmit the legacy preamble in the corresponding region.

Embodiment 2

The resource for the enhanced preamble may be configured in a specific region (e.g., contention free region) of the NPRACH resource for the legacy preamble.

In this case, the RAPID for the enhanced preamble is not newly configured and used and the legacy RAPID may be used.

When the UE selects the subcarrier in order to transmit the enhanced preamble, the UE may be configured to select the subcarrier index based on a subcarrier spacing of 3.75 kHz and use the RAPID corresponding to the selected subcarrier index.

In this case, since the enhanced preamble uses a subcarrier spacing (e.g., 1.25 kHz) smaller than 3.75 kHz, a plurality of subcarriers for transmitting the enhanced preamble may be present in the subcarrier selected by the UE and the UE may transmit the enhanced preamble by selecting one of the plurality of subcarriers.

For example, when the subcarrier spacing for the enhanced preamble is 1.25 kHz, a maximum of three candidate subcarriers may be present in the subcarrier selected by the UE and the UE may transmit the enhanced preamble by selecting one of three candidate subcarriers.

In this case, all UEs may be configured to select one of three candidate subcarriers based on the same value in the same cell and different cells may have different values.

For example, the UE may select one subcarrier based on a cell ID among three candidate subcarriers for transmitting the enhanced preamble.

Specifically, when the subcarrier having the subcarrier spacing of 3.75 kHz which the UE selects to transmit the enhanced preamble is SC3.75, SC1.75 which is an index of the subcarrier having the subcarrier spacing of 1.75 kHz for actually transmitting the enhanced preamble may be determined as shown in Equation 5 below.

$$SC_{1.25}=SC_{3.75}*3+(CID \text{ modular } 3) \qquad [\text{Equation 5}]$$

According to Equation 5, when SC3.75 is 32 and CID is 20, SC1.25 may become 98. In this case, when a single subcarrier is configured by the subcarrier of 1.25 kHz, the UE may transmit the enhanced preamble to subcarrier #98.

In this case, since SC3.75 is 32, the RAPID of the enhanced preamble may become 32.

In Equation 3, 3 is inserted because the subcarrier spacing is 3 times between 3.75 kHz and 1.25 kHz and a value of Equation '3' may be changed according to a difference value of the subcarrier spacing.

When such a method is used, a specific subcarrier index (e.g., based on 1.25 kHz) used specific to the cell is determined, there is an effect that an influence of inter-carrier-interference between the UEs transmitting the enhanced preamble is reduced in an intra cell.

Embodiment 3

The resource for the enhanced preamble may be configured in the specific region (e.g., contention free region) of the NPRACH resource for the legacy preamble.

In this case, when a maximum value of the RAPID for the enhanced preamble is larger than 64, a method for configuring the RAPID will be described.

Embodiment 3-1

When the maximum value of the RAPID for the enhanced preamble is larger than 64, the RAPID may be configured by using the 6-bit field and the reserved field of the RAR sub-header.

Specifically, when K (K is a positive integer smaller than 47) subcarriers are configured for the NPRACH resource or K subcarriers are configured to a region for the legacy preamble through an additional parameter (for example, when RAPIDs of 0 to K−1 are used for the legacy preamble), K to 62 may be expressed as the 6-bit field of the sub-header of the RAR, and as a result, there is no case of confusion with the legacy preamble.

However, when the maximum value of the RAPID for the enhanced preamble is RAPIDMAX and the value of RAPIDMAX is a positive integer equal to or larger than 64, RAPIDs of 63 to RAPIDMAX−1 may be configured by using the reserved field of the RAR.

In this case, the RAPID field value of the RAR sub-header may be fixed and set to a specific value.

For example, when the value of the RAPID field of the sub-header is set to '63' (e.g., all 1 for RAPID field), it is indicated that 6 bits of the RAPID field of the sub-header are all used, and as a result, the UE may verify the RAPID through the reserved field of the RAR other than the RAPID field of the sub-header.

When the reserved field of the RAR has a total of 6 bits, but 5 bits which are consecutively present are configured to be used in order to represent the RAPID of the enhanced preamble, a maximum of 63 RAPIDs may be additionally expressed (when 6 bits are used, a maximum of 127 RAPIDs may be additionally expressed).

When such a method is used, the RAPID of the enhanced preamble does not overlap even the RAPID used for the legacy preamble, and as a result, there is an influence on the legacy UE.

Embodiment 3-2

When the maximum value of the RAPID for the enhanced preamble is larger than 64, the RAPID may be configured by using bits other than bits used for the legacy preamble in the sub-header.

Specifically, when K (K is a positive integer smaller than 47) subcarriers are configured for the legacy NPRACH resource or K subcarriers are configured in the region for the legacy preamble through the additional parameter (for example, when RAPIDs of 0 to K−1 are used for the legacy preamble), the RAR sub-header value may become one specific value (e.g., 63 (=all values of the RAPID field are 1)) among K to 63 or any value of K to 63 and all of the values may be configured to be used as a value indicating the enhanced preamble.

That is, the when RAPID field value of the RAR sub-header is set to one of K to 63, the legacy UE may recognize that the corresponding RAR is not the RAR for the legacy preamble.

Further, the RAPID value of the enhanced preamble may be configured to be configured through the reserved field of the RAR and transmitted to the UE.

When 5 bits of the reserved field of the RAR is configured to be used as the RAPID field for the enhanced preamble, the RAPID value for the enhanced preamble may be set to 0 to 63 or K to K+63.

When 6 bits are used as the reserved field of the RAR for the enhanced preamble, a maximum of 127 RAPIDs may be additionally represented.

When such a method is used, the RAPID used by the legacy preamble and the RAPID of the enhanced preamble do not overlap with each other, and as a result, there is no influence on the legacy UE.

Further, even though the RAPID value recognized by the UE that transmits the legacy preamble and the RAPID value recognized by the UE that transmits the enhanced preamble overlap with each other, the legacy UE may recognize that the corresponding RAR is not the RAR for the legacy preamble by the RAPID field value of the RAR sub-header verified by the legacy UE, and as a result, there is no influence on the legacy UE.

Case of Configuring Independent Resource for New Preamble

When the NPRACH resource for the enhanced preamble is configured independently of the NPRACH resource configured for the legacy preamble, the enhanced preamble may be configured to use all of 64 RAPIDs of 0 to 63.

The base boundary (e.g., wraparound reference) of the legacy NPRACH resource may be 45 kHz (e.g., 12 tones). Since the subcarrier spacing of the enhanced preamble has a smaller value (e.g., 1.25 kHz) than the subcarrier spacing of the legacy preamble, the base boundary of the NPRACH resource of the enhanced preamble may also be newly configured.

In this case, when the number of tones configured for the enhanced preamble is K, a frequency domain constituted by K tones may be configured to be multiplexed with the legacy NPRACH, NPUSCH, etc.

It is assumed and described that the value of K is 36 or 48, but K may have other values.

When a maximum hopping gap of the format of the enhanced preamble format is 22.5 kHz, a region required for wraparound is 45 kHz, twice the maximum hopping gap. In this case, since the enhanced preamble is transmitted through the subcarrier having the subcarrier spacing of 1.25 kHz in the 45 kHz band, the value of K may be 36.

When the maximum hopping gap of the format of the enhanced preamble is 30 kHz, the K value may be 48 in the same scheme.

Additionally, when the maximum hopping gap of the format of the enhanced preamble is 20 kHz, the K value may be 32. In this case, when two times of K is configured as an NPRACH resource for the enhanced preamble, all 64 RAPIDs may be mapped to the subcarriers one to one.

Further, the number of subcarriers allocated to the NPRACH for the enhanced preamble is set to numbers that are divided by K among 1 to 144, thereby informing the UE of the NPRACH resource.

For example, when the value of K is '36', one value of {n36, n72, n108, n144} may be configured and when the value of K is '48', one value of {n48, n96, n144} may be configured as the NPRACH resource.

When K is '48' and the number of subcarriers allocated to the NPRACH for the enhanced preamble format is continuously fixed to 48, it may be configured to use RAPIDs of the same number as the legacy FDD.

Embodiment 4

Different methods may be used according to the number of subcarriers set through system information (e.g., SIB2-NB, SIB22-NB, etc.).

Case 1: Case where the set number of subcarriers is equal to or smaller than 64, Case 2: Case where the set number of subcarriers is larger than 64

In Case 1, when subcarriers of a number equal to or smaller than 64 are configured as the resource for transmitting the preamble by the eNB, the UE may be configured to use all RAPIDs of 0 to 63 mapped to respective subcarrier indexes one to one.

In this case, $N_{SC}^{NPRACH}$ ($N_{SC}^{NPRACH} \leq 64$) which is the set number of subcarriers is n*K (where n is a positive integer equal to or larger than 1) and n and k which cause a value of n*K to be equal to or smaller than 64 may be configured to use RAPIDs of 0 to (n*K)−1 mapped to the respective subcarrier indexes one to one.

In addition, the remaining RAPIDS of n*K to 63 may be left as the reserved.

In Case 2, when subcarriers of a number larger than 64 are configured as the resource for transmitting the preamble by the eNB, the UE may be configured to use RAPIDs of 0 to 63 mapped to predetermined specific subcarrier indexes.

When the set number of subcarriers is $N_{SC}^{NPRACH}$ ($N_{SC}^{NPRACH} > 64$), only the remaining 64 subcarrier indexes may be configured to be used other than $N_{SC}^{NPRACH} - 64$ subcarriers among a total of $N_{SC}^{NPRACH}$ subcarriers.

Figure 13:
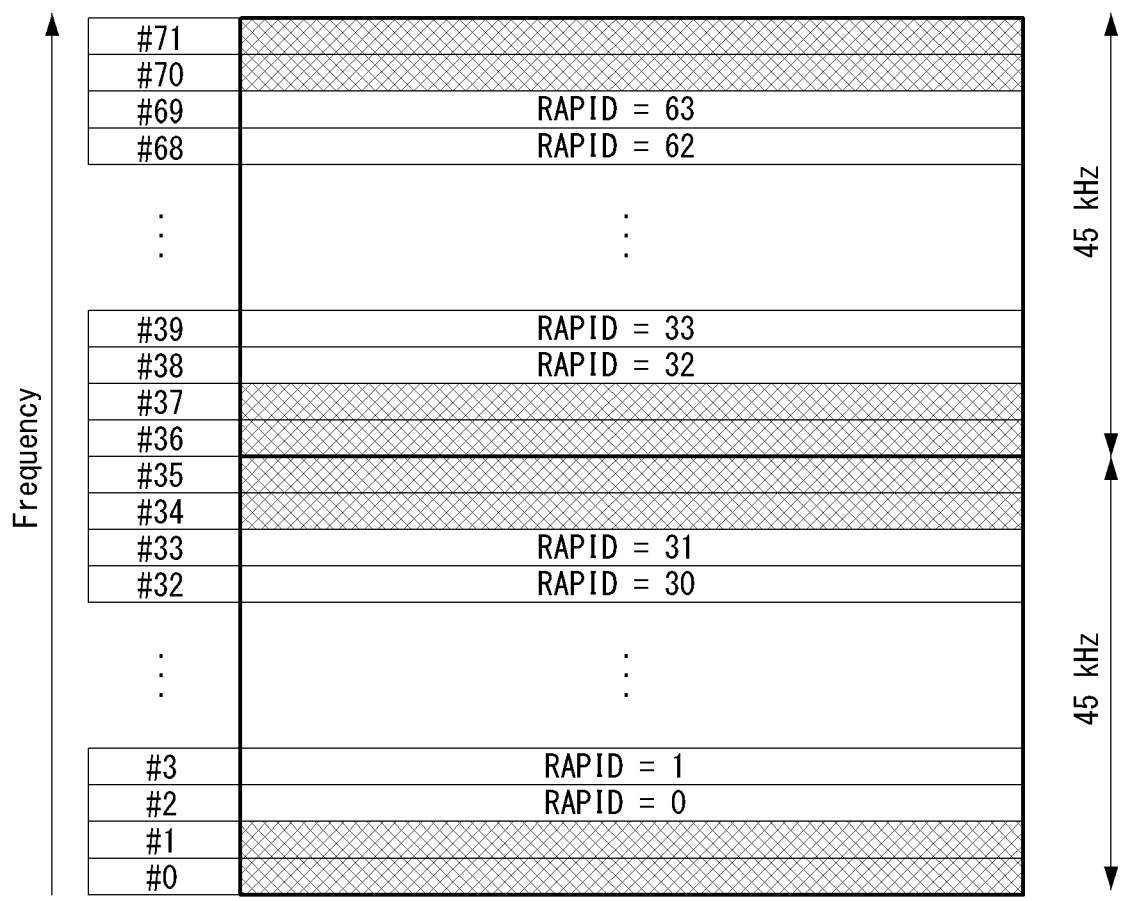
FIG. 13 is a diagram illustrating yet another example of the subcarrier index for preamble transmission to which the method proposed by this specification may be applied.
Figure 14:
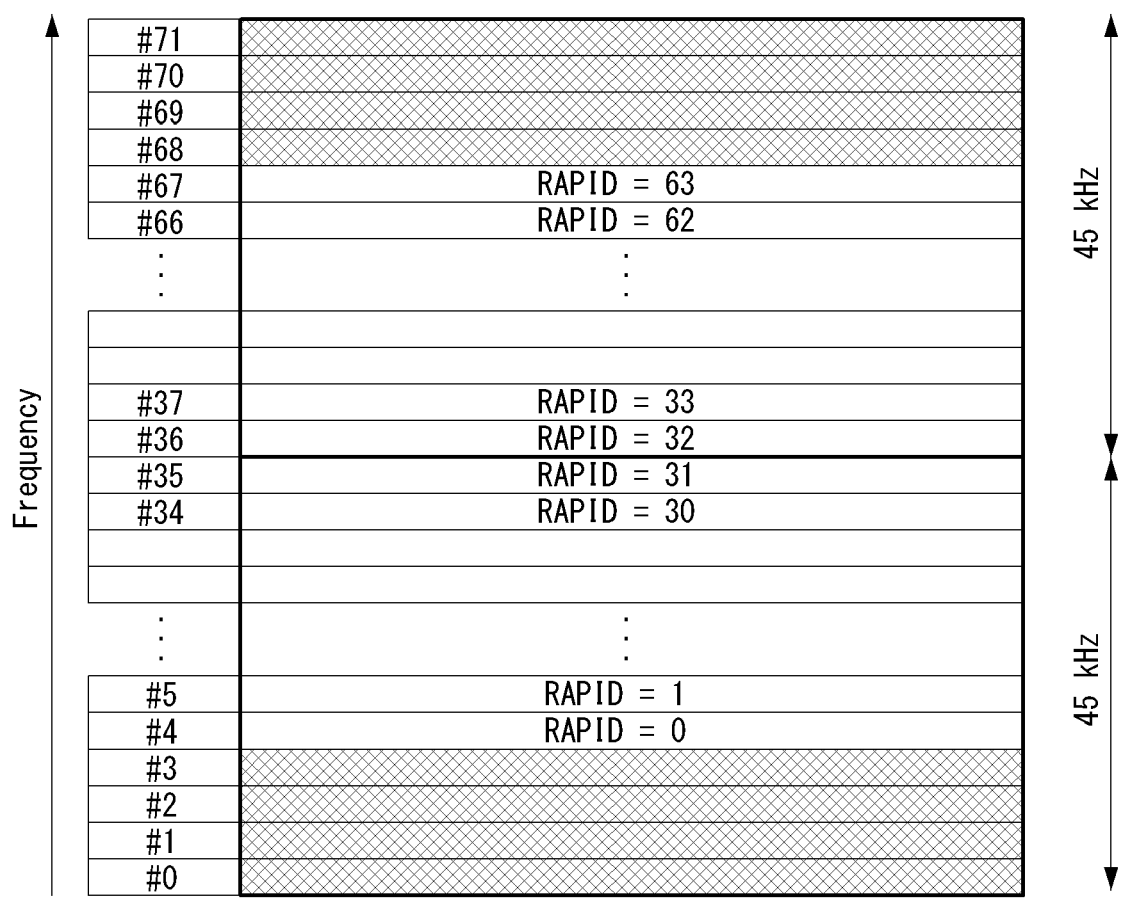
FIG. 14 is a diagram illustrating still yet another example of the subcarrier index for preamble transmission to which the method proposed by this specification may be applied.

In this case, the selected subcarriers may have the following rule and may be configured as illustrated in FIG. 13 or 14.

FIG. 13 is a diagram illustrating yet another example of the subcarrier index for preamble transmission to which the method proposed by this specification may be applied.

First, when $N_{SC}^{NPRACH}$ ($N_{SC}^{NPRACH} > 64$) which is the set number of subcarriers is m*K (where m is a positive integer equal to or larger than 1) as illustrated in FIG. 13, the number of subcarriers which needs to be configured not to be used becomes (m*K−64) and (m*K−64)/2m from a subcarrier having a largest subcarrier index among each K subcarriers and (m*K−64)/2m from a subcarrier having a smallest subcarrier index may be configured not to be used.

In addition, the remaining 64 subcarriers may be configured to use the RAPID value from 0 to 63 in ascending order from a subcarrier having a small subcarrier index value.

For example, when K is '36' and m is '2', the UE may be configured to use a total of 72 subcarriers for the enhanced preamble.

In this case, since a total of 8 subcarriers are configured no to be used according to the above description, when two subcarriers having the largest index value and two subcarriers having the smallest index value are configured not to be used among 36 subcarriers, eight subcarriers may be configured not to be used among a total of 72 subcarriers.

When the enhanced NPRACH resource is multiplexed with the legacy NPRACH, NPUSCH, etc., through such a method, carriers which are not used may serve as a guard.

FIG. 14 is a diagram illustrating still yet another example of the subcarrier index for preamble transmission to which the method proposed by this specification may be applied.

Second, although the method of FIG. 14 is similar to the method described in FIG. 13, a location of a subcarrier which is not used may be changed.

Specifically, when $N_{SC}^{NPRACH}$ ($N_{SC}^{NPRACH} > 64$) which is the number of subcarriers set by the eNB is m*K (where m is a positive integer equal to or larger than 1), the number of subcarriers which need to be configured not to be used becomes (m*K−64) and (m*K−64)/2 from the subcarrier having the largest subcarrier index among each K subcarriers and (m*K−64)/2 from the subcarrier having the smallest subcarrier index may be configured not to be used.

That is, a total of (m*K−64) subcarriers may be configured not to be used.

In addition, the remaining 64 subcarriers may be configured to use the RAPID value from 0 to 63 in ascending order from a subcarrier having a small subcarrier index value.

For example, when K is '36' and m is '2', the UE may be configured to use a total of 72 subcarriers for the enhanced preamble.

In this case, since a total of 8 subcarriers are configured no to be used according to the above description, when four subcarriers having the largest index value and four subcarriers having the smallest index value are configured not to be used among 72 subcarriers, eight subcarriers may be configured not to be used among a total of 72 subcarriers.

Embodiment 5

Only a subcarrier at a specific location may be preconfigured to be used for transmitting the enhanced preamble regardless of the number of subcarriers set through the system information (e.g., SIB2-NB, SIB22-NB, etc.).

Among rules preconfigured between the eNB and the UE, as an example, L RAPIDs are configured to be used per basic region of the NPRACH resource of the enhanced preamble constituted by K subcarriers to use a total of $$L \times \frac{144}{K}$$

RAPIDS.

In this case, in order to use a maximum of 64 RAPIDs, the L value should be configured to have the same value as $$\left\lfloor \frac{64+K}{144} \right\rfloor.$$

For example, when the value of K is set to '36', L becomes '16' and the total number of usable RAPIDs becomes 64. That is, since only 16 specific subcarriers are used among 36 subcarriers, only 16 specific subcarriers specified to the cell may be configured to be used.

Through such a method, there is an effect that inter cell interference may be reduced.

In Embodiment 5, 16 specific subcarriers may be determined through the following method.

Embodiment 5-1

16 specific subcarriers distinguish even number Cell ID and odd number Cell ID from each other based on the Cell ID and cells which belong to a first group may be configured as 16 subcarriers other than subcarriers having the smallest index value and the largest index value among even-numbered subcarriers among 36 subcarriers.

That is, among even numbered subcarriers, 16 subcarriers other than the subcarriers having the smallest index value and the largest index value may be configured to be used for transmitting the enhanced preamble.

For example, 16 subcarriers other than the subcarriers having the smallest index value and the largest index value among the even numbered subcarriers may become subcarriers having index values of {2, 4, 6, 8, 10, 12, 14, 16, 18, 20, 22, 24, 26, 28, 30, 32}.

16 subcarriers other than the subcarriers having the smallest index value and the largest index value among odd numbered subcarriers may become subcarriers having index values of {3, 5, 7, 9, 11, 13, 15, 17, 19, 21, 23, 25, 27, 29, 31, 33}.

In this case, by not using subcarriers at both ends, unused subcarriers may serve as the guard when an enhanced NPRACH resource is multiplexed with legacy NPRACH, NPUSCH, and the like.

Table 10 below shows examples of a subcarrier index and RAPID for Embodiment 5-1. Cells of two groups described above may be configured so that the RAPID is determined based on one table.

TABLE 10

| $SC_{EP}$ modular 36 | RAPID | | | |
|---|---|---|---|---|
| | $SC_{EP}$ (0~35) | $SC_{EP}$ (36~71) | $SC_{EP}$ (72~107) | $SC_{EP}$ (108~143) |
| 2 or 3 | 0 | 16 | 32 | 48 |
| 4 or 5 | 1 | 17 | 33 | 49 |
| 6 or 7 | 2 | 18 | 34 | 50 |
| 8 or 9 | 3 | 19 | 35 | 51 |
| 10 or 11 | 4 | 20 | 36 | 52 |
| 12 or 13 | 5 | 21 | 37 | 53 |
| 14 or 15 | 6 | 22 | 38 | 54 |
| 16 or 17 | 7 | 23 | 39 | 55 |
| 18 or 19 | 8 | 24 | 40 | 56 |
| 20 or 21 | 9 | 25 | 41 | 57 |
| 22 or 23 | 10 | 26 | 42 | 58 |
| 24 or 25 | 11 | 27 | 43 | 59 |
| 26 or 27 | 12 | 28 | 44 | 60 |
| 28 or 29 | 13 | 29 | 45 | 61 |
| 30 or 31 | 14 | 30 | 46 | 62 |
| 32 or 33 | 15 | 31 | 47 | 63 |

Embodiment 5-2

Embodiment 5-2 has a similar method to Embodiment 5-1, but the even number Cell ID and the odd number Cell ID may be distinguished from each other based on the Cell ID and cells of two groups may determine RAPID based on different tables.

That is, mapping orders of subcarrier indexes and RAPIDs of cells using subcarriers having odd indexes and cells of using subcarriers having even indexes may be configured to be different from each other.

For example, a cell having the even number Cell ID may determine the RAPID based on Table 11 below and a cell having the odd number Cell ID may determine the RAPID based on Table 12 below.

TABLE 11

| $SC_{EP}$ modular 36 | RAPID | | | |
|---|---|---|---|---|
| | $SC_{EP}$ (0~35) | $SC_{EP}$ (36~71) | $SC_{EP}$ (72~107) | $SC_{EP}$ (108~143) |
| 32 | 0 | 16 | 32 | 48 |
| 30 | 1 | 17 | 33 | 49 |
| 28 | 2 | 18 | 34 | 50 |
| 26 | 3 | 19 | 35 | 51 |
| 24 | 4 | 20 | 36 | 52 |
| 22 | 5 | 21 | 37 | 53 |
| 20 | 6 | 22 | 38 | 54 |
| 18 | 7 | 23 | 39 | 55 |
| 16 | 8 | 24 | 40 | 56 |
| 14 | 9 | 25 | 41 | 57 |
| 12 | 10 | 26 | 42 | 58 |
| 10 | 11 | 27 | 43 | 59 |
| 8 | 12 | 28 | 44 | 60 |
| 6 | 13 | 29 | 45 | 61 |
| 4 | 14 | 30 | 46 | 62 |
| 2 | 15 | 31 | 47 | 63 |

TABLE 12

| $SC_{EP}$ modular 36 | RAPID | | | |
|---|---|---|---|---|
| | $SC_{EP}$ (0~35) | $SC_{EP}$ (36~71) | $SC_{EP}$ (72~107) | $SC_{EP}$ (108~143) |
| 3 | 0 | 16 | 32 | 48 |
| 5 | 1 | 17 | 33 | 49 |
| 7 | 2 | 18 | 34 | 50 |
| 9 | 3 | 19 | 35 | 51 |
| 11 | 4 | 20 | 36 | 52 |
| 13 | 5 | 21 | 37 | 53 |
| 15 | 6 | 22 | 38 | 54 |
| 17 | 7 | 23 | 39 | 55 |
| 19 | 8 | 24 | 40 | 56 |
| 21 | 9 | 25 | 41 | 57 |

TABLE 12-continued

| $SC_{EP}$ modular 36 | RAPID | | | |
|---|---|---|---|---|
| | $SC_{EP}$ (0~35) | $SC_{EP}$ (36~71) | $SC_{EP}$ (72~107) | $SC_{EP}$ (108~143) |
| 23 | 10 | 26 | 42 | 58 |
| 25 | 11 | 27 | 43 | 59 |
| 27 | 12 | 28 | 44 | 60 |
| 29 | 13 | 29 | 45 | 61 |
| 31 | 14 | 30 | 46 | 62 |
| 33 | 15 | 31 | 47 | 63 |

Tables 11 and 12 are reversed in terms of the mapping order of the subcarrier index and the RAPID. When such a method is used, by not using subcarriers at both ends, unused subcarriers may serve as the guard when the enhanced NPRACH resource is multiplexed with legacy NPRACH, NPUSCH, and the like.

Further, a probability of an RAPID receiving error by inter cell interference may also be reduced.

When the value of K is set to '36', a frequency size of performing hopping between symbol groups constituting the enhanced preamble may be configured to have one of four values as shown in Table 13 below according to a value of a start subcarrier of each preamble.

TABLE 13

| $SC_{EP}$ | Hopping pattern $\{1^{st} \& 2^{nd}, 2^{nd} \& 3^{rd}, 3^{rd} \& 4^{th}, 4^{th} \& 5^{th}\}$ |
|---|---|
| {2, 4, 6, 8, 10, 12, 14, 16} | {−1.25 kHz, +22.5 kHz, −22.5 kHz, +1.25 kHz} |
| {3, 5, 7, 9, 11, 13, 15} | {+1.25 kHz, +22.5 kHz, −22.5 kHz, −1.25 kHz} |
| {17, 19, 21, 23, 25, 27, 29, 31, 33} | {+1.25 kHz, −22.5 kHz, +22.5 kHz, −1.25 kHz} |
| {18, 20, 22, 24, 26, 28, 30, 32} | {−1.25 kHz, −22.5 kHz, +22.5 kHz, +1.25 kHz} |

When the K value is set to '48' as another example of the embodiment, L may be determined to be '21' and the total number of RAPIDs may be determined to be used according to the method described in Embodiment 5.

That is, since only 21 specific subcarriers are used among 48 subcarriers, 21 specific subcarriers specific to the cell may be configured to be used and this may reduce the inter cell interference.

In this case, since 63 RAPIDs are used, RAPIDs of 0 to 52 may be configured to be used and 63 may be left as reserved.

In this case, 21 specific subcarriers may be configured through Embodiments 5-3 and 5-4 below similarly to Embodiments 5-1 and 5-2.

Embodiment 5-3

21 specific subcarriers distinguish even number Cell ID and odd number Cell ID from each other based on the Cell ID and the cells which belong to the first group may be configured as even numbered subcarriers other than subcarriers (e.g., 0, 1, 2) having the smallest index value and subcarriers (e.g., 45, 46, 47) having the largest index value among 48 subcarriers.

That is, even numbered subcarriers become {4, 6, 8, 10, 12, 14, 16, 18, 20, 22, 24, 26, 28, 30, 32, 34, 36, 38, 40, 42, 44} and odd numbered subcarriers become {3, 5, 7, 9, 11, 13, 15, 17, 19, 21, 23, 25, 27, 29, 31, 33, 35, 37, 39, 41, 43} other than the subcarriers (e.g., 0, 1 2) having the smallest index value and the subcarriers (e.g., 45, 46, 47) having the largest index value among 48 subcarriers.

In this case, by not using subcarriers at both ends, unused subcarriers may serve as the guard when an enhanced NPRACH resource is multiplexed with legacy NPRACH, NPUSCH, and the like.

Table 14 below shows examples of a subcarrier index and RAPID for Embodiment 5-3. The cells of two groups described above may be configured so that the RAPID is determined based on one table.

TABLE 14

| $SC_{EP}$ modular 48 | RAPID | | |
|---|---|---|---|
| | $SC_{EP}$ (0~47) | $SC_{EP}$ (48~95) | $SC_{EP}$ (96~143) |
| 3 or 4 | 0 | 21 | 42 |
| 5 or 6 | 1 | 22 | 43 |
| 7 or 8 | 2 | 23 | 44 |
| 9 or 10 | 3 | 24 | 45 |
| 11 or 12 | 4 | 25 | 46 |
| 13 or 14 | 5 | 26 | 47 |
| 15 or 16 | 6 | 27 | 48 |
| 17 or 18 | 7 | 28 | 49 |
| 19 or 20 | 8 | 29 | 50 |
| 21 or 22 | 9 | 30 | 51 |
| 23 or 24 | 10 | 31 | 52 |
| 25 or 26 | 11 | 32 | 53 |
| 27 or 28 | 12 | 33 | 54 |
| 29 or 30 | 13 | 34 | 55 |
| 31 or 32 | 14 | 35 | 56 |
| 33 or 34 | 15 | 36 | 57 |
| 35 or 36 | 16 | 37 | 58 |
| 37 or 38 | 17 | 38 | 59 |
| 39 or 40 | 18 | 39 | 60 |
| 41 or 42 | 19 | 40 | 61 |
| 43 or 44 | 20 | 41 | 62 |

Embodiment 5-4

Embodiment 5-4 has a similar method to Embodiment 5-3, but the even number Cell ID and the odd number Cell ID may be distinguished from each other based on the Cell ID and cells of two groups may determine RAPID based on different tables.

That is, mapping orders of subcarrier indexes and RAPIDs of cells using subcarriers having odd indexes and cells of using subcarriers having even indexes may be configured to be different from each other.

For example, a cell having the even number Cell ID may determine the RAPID based on Table 15 below and a cell having the odd number Cell ID may determine the RAPID based on Table 16 below.

TABLE 15

| $SC_{EP}$ modular 48 | RAPID | | |
|---|---|---|---|
| | $SC_{EP}$ (0~47) | $SC_{EP}$ (48~95) | $SC_{EP}$ (96~143) |
| 44 | 0 | 21 | 42 |
| 42 | 1 | 22 | 43 |
| 40 | 2 | 23 | 44 |
| 38 | 3 | 24 | 45 |
| 36 | 4 | 25 | 46 |
| 34 | 5 | 26 | 47 |
| 32 | 6 | 27 | 48 |
| 30 | 7 | 28 | 49 |
| 28 | 8 | 29 | 50 |
| 26 | 9 | 30 | 51 |

TABLE 15-continued

| | RAPID | | |
|---|---|---|---|
| $SC_{EP}$ modular 48 | $SC_{EP}$ (0~47) | $SC_{EP}$ (48~95) | $SC_{EP}$ (96~143) |
| 24 | 10 | 31 | 52 |
| 22 | 11 | 32 | 53 |
| 20 | 12 | 33 | 54 |
| 18 | 13 | 34 | 55 |
| 16 | 14 | 35 | 56 |
| 14 | 15 | 36 | 57 |
| 12 | 16 | 37 | 58 |
| 10 | 17 | 38 | 59 |
| 8 | 18 | 39 | 60 |
| 6 | 19 | 40 | 61 |
| 4 | 20 | 41 | 62 |

TABLE 16

| | RAPID | | |
|---|---|---|---|
| $SC_{EP}$ modular 48 | $SC_{EP}$ (0~47) | $SC_{EP}$ (48~95) | $SC_{EP}$ (96~143) |
| 3 | 0 | 21 | 42 |
| 5 | 1 | 22 | 43 |
| 7 | 2 | 23 | 44 |
| 9 | 3 | 24 | 45 |
| 11 | 4 | 25 | 46 |
| 13 | 5 | 26 | 47 |
| 15 | 6 | 27 | 48 |
| 17 | 7 | 28 | 49 |
| 19 | 8 | 29 | 50 |
| 21 | 9 | 30 | 51 |
| 23 | 10 | 31 | 52 |
| 25 | 11 | 32 | 53 |
| 27 | 12 | 33 | 54 |
| 29 | 13 | 34 | 55 |
| 31 | 14 | 35 | 56 |
| 33 | 15 | 36 | 57 |
| 35 | 16 | 37 | 58 |
| 37 | 17 | 38 | 59 |
| 39 | 18 | 39 | 60 |
| 41 | 19 | 40 | 61 |
| 43 | 20 | 41 | 62 |

As yet another embodiment of the present invention, when the number RAPIDs for the enhanced preamble is larger than 64, the configuration may be made through the following method.

Embodiment 6

When the maximum value of the RAPID for the enhanced preamble is larger than 64, the RAPID may be configured by using the 6-bit field and the reserved field of the RAR sub-header.

Specifically, the eNB may configure the RAPIDs of 0 to 63 to be expressed by only the 6-bit field of the RAR subheader and the RAPID to be represented from 64 to RAPIDMAX which is the maximum value of the RAPID by additionally using the reserved field of the RAR.

A total of 6 bits are present in the reserved field of the RAR, but the number of subcarriers for the enhanced preamble is 144 (when the subcarrier spacing is 1.25 kHz) on a frequency axis, so that a maximum of 144 RAPIDS may be configured to be represented by additionally using 2 bits of the reserved field of the RAR.

It may be configured to represent the RAPID of the enhanced preamble through a field having a total size of 8 bits by additionally combining 2 bits of the RAR reserved field with 6 bits of the RAR sub-header.

That is, when the enhanced preamble is transmitted, the size of the field representing the RAPID in the RAR sub-header may be set to 8 bits.

In this case, the UE may be configured to recognize the RAR reserved field as MSB. For example, when the 6-bit field values of the RAR sub-header are all '1' and the 2-bit value of the RAR reserved field indicates '01', it may be configured to represent an RAPID of 127 (=01111111).

That is, the value of the reserved field is recognized as a foremost value to represent the RAPID.

As another embodiment of the present invention, the 6-bit field of the RAR sub-header may be configured to represent the value of floor(RAPID/3) and 2 bits of the RAR reserved field may be configured to represent the value of RAPID modular 3.

For example, when the RAPID value is 127, it may be configured that the 6-bit field of the RAR subheader is represented by 101010 because of floor(127/3)=42 and the 2-bit value of the RAR reserved field is represented by 01 because of 127 modular 3=1.

By such a method, the preamble may be transmitted by using all subcarriers available on the frequency axis based on the enhanced preamble using the subcarrier spacing of 1.25 kHz.

As yet another embodiment of the present invention, when a start subframe is selected in which the resource for the legacy preamble and the resource for the enhanced preamble share the same RA-RNTI value on the frequency axis, the eNB may additionally transmit to the UE a parameter indicating an RAPID offset through an SIB that configures the resource the enhanced preamble.

That is, since the enhanced UE may know that the resource to currently transmit the preamble and the legacy resource should use the same RA-RNTI, the enhanced UE may be configured to receive a first RAPID value for the resource for the enhanced preamble from the eNB by recognizing the RAPID offset value additionally transmitted through the SIB.

When the enhanced preamble is configured to use 72 subcarriers and the resource for the legacy preamble and the resource for the enhanced preamble share the same RA-RNTI value on a time axis, the eNB should transmit the RAPID offset value to the UE (e.g., when the value is 24) and the UE for transmitting the enhanced preamble may be configured to recognize the RAPIDs corresponding to 72 subcarriers as selected subcarrier index+RAPID offset (e.g., 24 to 95).

In this case, in regard to the RAPID offset value, when the resource for the legacy preamble is configured for each of one or more CE levels in the corresponding carrier, the RAPID offset may be independently transmitted for each CE level.

By such a method, a problem may be solved, which occurs when the UEs sharing the same RA-RNTI value also have the RAPID.

As still yet another embodiment, the UE directly recognizes configuration information for the resource for the legacy preamble selecting the start subframe in which the same RA-RNTI value is shared on the time axis may determine the first RAPID value of the resource for the enhanced preamble.

That is, since the UE that is to transmit the enhanced preamble may recognize that the resource to currently transmit the preamble and the legacy resource should the same RA-RNTI, the UE may calculate the maximum value of the RAPID to be used in the legacy resource by verifying the configuration for the legacy resource.

Therefore, the UE that is to transmit the enhanced preamble may determine the range of the RAPID value to be used in the resource for the enhanced preamble based on the calculated value and transmit the RAR according to the range.

When the enhanced preamble is configured to use 72 subcarriers and the resource for the legacy preamble and the resource for the enhanced preamble share the same RA-RNTI value on the time axis, the UE that is to transmit the enhanced preamble verifies the configuration corresponding to the resource for the legacy preamble to calculate RAPIDlegacy_MAX which is the maximum value of the RAPID used by the corresponding resource.

The UE that calculates the RAPIDlegacy_MAX may recognize the RAPID corresponding to 72 subcarriers of the resource for the enhanced preamble as the selected subcarrier index+RAPIDlegacy_MAX.

For example, when RAPIDMAX is '12', the RAPID for the enhanced preamble may be determined to be 12 to 83.

Such a method may continuously have independent an RAPIDMAX depending on overlapping legacy resources.

By such a method, a problem may be solved, which occurs when the UEs sharing the same RA-RNTI value also have the RAPID and an additional signaling is not required.

As still yet another embodiment of the present invention, only when a start subframe is selected in which the resource for the legacy preamble and the resource for the enhanced preamble share the same RA-RNTI value on the time axis, the RAPID of the enhanced preamble may be configured to adopt only a value after a specific value.

That is, since the UE that is to transmit the enhanced preamble may recognize that the resource to currently transmit the preamble and the legacy resource should the same RA-RNTI, the UE may continuously use only the RAPID after the RAPIDlegacy_MAX value which is the fixed value.

In this case, the RAPIDlegacy_MAX value may be 47 which is the maximum value which may be used by the legacy preamble. When the enhanced preamble is configured to use 72 subcarriers and the resource for the legacy preamble and the resource for the enhanced preamble share the same RA-RNTI value on the time axis, the UE may recognize the RAPIDs corresponding to 72 subcarriers as the selected subcarrier index+RAPIDlegacy_MAX in the resource for the enhanced preamble.

For example, when the RAPIDlegacy_MAX value is '47', the RAPID for the enhanced preamble may be determined to be 48 to 119.

By such a method, a problem may be solved, which occurs when the UEs sharing the same RA-RNTI value also have the RAPID and an additional signaling is not required.

Further, there is an effect that the UE need not calculate the maximum value by verifying the legacy preamble.

Design of DCI Format N1 for NPDCCH Order for New Preamble

When a RACH procedure is started with an NPDCCH order using a specific DCI format (DCI format N1), an enhanced preamble that is a preamble using Format 2, which is an enhanced preamble format, may be used in addition to the existing legacy preamble.

In this case, the eNB may configure the DCI field of the NPDCCH differently according to the preamble format of the preamble allocated (or configured) to the UE and transmit the DCI field to the UE.

Specifically, when the subcarrier spacing for transmitting the preamble varies according to the preamble format, the eNB should announce the preamble format of the preamble to be transmitted by the UE and the subcarriers for transmission of the preamble.

For example, the eNB may encapsulate an indicator indicating the preamble format of the preamble to be transmitted by the UE and a field indicating the subcarrier and transmit the indicator and the field to the UE.

In this case, the indicator may have a value of '0' when the preamble format is 0 or 1 and a value of '1' when the preamble format is 2.

Preamble format 0 or 1 may have the subcarrier spacing of 3.75 kHz as described above and Preamble format 2 (FDD NPRACH format 2) may have the subcarrier spacing of 1.25 kHz.

Hereinafter, a preamble having the preamble format of 0 or 1 is referred to as a first preamble (or a legacy preamble) and a preamble having the preamble format of 2 is referred to as a second preamble (or an enhanced preamble).

The NPRACH resources for the second preamble may overlap or may not overlap with the NPRACH resource for the first preamble.

Thus, there may be the NPRACH resource for the first preamble and the NPRACH resource for the second preamble, each having the same CE level and not overlapping on the same carrier.

In this case, the eNB needs to instruct the UE whether to transmit the first preamble or the second preamble through the NPDCCH order.

Therefore, DCI format N1 for the NPDCCH order may include a field having a size of k bits (for example, 1 bit) indicating the preamble to be transmitted by the UE.

That is, when the RACH procedure is started based on the NPDCCH order, the eNB may encapsulate the indicator indicating the format of the preamble to be transmitted by the UE in the DCI transmitted through the NPDCCH and transmit the indicator.

Table 17 below shows an example of DCI format N1.

TABLE 17

| DCI format N1 for NPDCCH order with C-RNTI | Bits |
|---|---|
| Flag for format N0/format N1 differentiation | 1 |
| NPDCCH order indicator (must be "1") | 1 |
| Starting number of NPRACH repetitions | 2 |
| Subcarrier indication of NPRACH | 6 |
| Carrier indication of NPRACH | 4 |
| All the remaining bits(10 bits) in format N1 are set to one | 10 |

As shown in Table 17, the length of DCI format N1 may be configured by a total of 24 bits and in order to avoid increasing the number of times of blind decoding of the UE, the remaining bits of 10 bits may be set to '1'.

In Table 17, Flag for format N0/format N1 differentiation is a flag indicating the format of the DCI and the Starting number of NPRACH repetitions means start number information related to a start number of repetition of the random access procedure.

Further, Carrier indication of NPRACH represents information related to the carrier for transmission of the preamble.

When DCI format N1 for the NPDCCH order described above configures 1 bit among the remaining 10 bits as the indicator indicating the preamble to be transmitted by the UE, 9 bits are set to '1' and DCI transmitted to the UE through the NPDCCH may thus maintain a length of 24 bits.

In this case, the indicator indicating the preamble to be transmitted by the UE may be referred to as a preamble format indicator or an FDD NPRACH format indication field.

Upon receiving the DCI from the eNB, the UE may transmit a preamble of a format indicated by a preamble format indicator to the eNB in order to perform the RACH procedure and the eNB may transmit a response message to the UE in response thereto.

In this case, even when only one of the NPRACH resource for the second preamble and the NPRACH resource for the first preamble is configured at the same CE level and in the same carrier, if the preamble format indicator is included in all DCIs transmitted to all UEs, the UE may be configured to disregard the value of the preamble format indicator or configured to recognize in advance that the value of the preamble format indicator is fixedly transmitted as a specific value (0 or 1).

In addition, even though an explicit field indicating the preamble format is included in DCI format N1 for initiating the RACH based on the NPDCCH order and only one of the first preamble resource and the second preamble resource is configured in a specific CE level and a specific carrier indicated through the DCI, when the value indicated by the explicit field indicating the preamble format is different, the UE may determine that the corresponding NPDCCH order is not valid.

Alternatively, the value of the explicit field indicating the preamble is disregarded and the preamble resource which exists in the specific CE level and the specific carrier is selected to transmit the preamble.

In this case, the preamble format indicator may be included in the DCI when the eNB and/or the UE supports Preamble format 2.

That is, the preamble format indicator may be included in the DCI and transmitted to the UE only when the eNB informs the UE that the eNB supports Preamble format 2 through a higher layer signaling (e.g., RRC signaling).

Such a method may increase the degree of freedom of the eNB.

As another embodiment of the present invention, when Preamble format 2 is used in addition to Preamble format 0 or 1 in the RACH procedure initiated by the NPDCCH order, the size of the field indicating the subcarrier may be changed according to the preamble format.

Specifically, when the NPRACH resource for the second preamble and the NPRACH resource for the first preamble using the same carrier and the same CE level overlap with each other, if the total number of used RAPIDs does not exceed 64, an additional field is not configured in DCI format N1 for the initiation of the RACH procedure based on the NPDCCH order.

That is, when the number of RAPIDs for the first preamble is set to K from 0 to K−1 and the RAPIDs for the second preamble are configured as K to 63, the type of preamble may be distinguished only by 6 bits of a "subcarrier indication of NPRACH" field which is information related to the subcarrier for transmitting the preamble for the RACH procedure in Table 17.

In this case, the subcarrier indication field of the NPRACH may be referred to as a subcarrier indication field.

In this case, in the subcarrier indication field, all of the states (for example, 0 to 47 among 64) previously used for the first preamble and reserved states (for example, 48 to 63 among 64), so that the first preamble and the second preamble may be distinguished.

Even when the type of preamble may be distinguished only by the subcarrier indication field, the UE may know that the value of the preamble format indicator is disregarded or fixedly transmitted to the specific value (0 or 1) if the preamble format indicator described above is commonly included in the DCIs of all UEs.

However, when the total number of RAPIDs supported by a specific NPRACH resource is larger than 64, irrespective of whether the NPRACH resource for transmission of the second preamble and the NPRACH resource for transmission of the first preamble overlap with each other, the number of bits of the subcarrier indication field needs to be increased in DCI format N1 for the NPDCCH order.

That is, as the size of the subcarrier spacing according to the format of the preamble decreases, the number of bits of the subcarrier indication field may be the same or increase.

For example, since preamble format 0/1 has the subcarrier spacing of 3.75 kHz, the maximum value of the number of RAPIDs of the preamble is 48. That is, a total of 48 subcarriers may be configured for transmission of the preamble in 1 RB (180 kHz) and the UE may transmit the preamble to the eNB through the subcarrier indicated by the subcarrier indication field in the DCI of the eNB.

Therefore, when the format of the preamble is 0/1, the subcarrier indication requires only the size of 6 bits in order to indicate the subcarrier for transmitting the preamble (which may indicate a maximum of 64 RAPIDs in the case of 6 bits).

For example, when the preamble format is 2, since the subcarrier spacing is 1.25 kHz, the maximum value of the number of RAPIDs of the preamble is 144. That is, a total of 144 subcarriers need to be configured in order to transmit the preamble in 1 RB (180 kHz).

Therefore, when the preamble format is 2, the subcarrier indication requires a size of at least 8 bits to indicate the subcarrier for transmitting the preamble.

That is, when the total number of allowed RAPIDs is RAPIDMAX, the size of the subcarrier indication field may be determined according to Equation 4 below.

$$\lceil \log_2(\text{RAPID}_{MAX}) \rceil \qquad \text{[Equation 4]}$$

According to Equation 4, if the RAPIDMAX is larger than 64 and does not exceed 128, the number of bits of the subcarrier indicator field may be configured by 7 bits and if the RAPIDMAX is larger than 128 and does not exceed 256, the number of bits of the subcarrier indicator field may be configured by 8 bits.

If R additional bit fields are required, R may not exceed a maximum of 10 bits by considering the total length (24 bits) of the DCI and 10-R bits which are the remaining bits are set to '1' as described above, and as a result, the total length of the DCI field becomes 24 bits.

In addition, a 1-bit additional field may be further included to instruct DCI format N1 for the NPDCCH order to perform symbol level scrambling or symbol group level scrambling. In this case, even when the NPRACH resource is indicated by the need of the eNB, the eNB may instruct the UE to perform the symbol level scrambling or symbol group level scrambling defined by the method known in advance through the DCI.

Such a method may enhance reliability of the preamble transmitted by the UE when the eNB determines that the corresponding UE is a UE positioned on a boundary with an adjacent cell.

Further, the second preamble may be a preamble including the symbol level scrambling or symbol group level scrambling or FDD NPRACH format 2 supporting the subcarrier spacing of 1.25 kHz.

The fields described above may be redundantly required. For example, if there is each of the NPRACH resource for the first preamble and the NPRACH resource for the second preamble that have the same CE level on the same carrier and do not overlap with each other and the maximum value of the number of RAPIDs allowed in the NPRACH resource for the second preamble is 144, the subcarrier indication becomes 8 bits requiring 2 bits in addition to 6 bits and the preamble format indication for indicating the preamble format is required.

In this case, since 3 bits are additionally required in the remaining 10 bits, only 7 bits may be all set to the value of '1'.

As still yet another embodiment of the present invention, the format indicator field indicating the preamble format may not be added to DCI format N1 for the NPDCCH order.

Specifically, when both the first preamble resource and the second preamble resource exist in the specific carrier level and the specific CE level indicated through DCI format N1 for the NPDCCH order, the corresponding UE may select the resource corresponding to the preamble format which is successful in the immediately previous RACH procedure and transmit the preamble.

That is, when the UE is in a connected mode, the UE has an experience in successfully performing the RACH procedure, and as a result, the UE may select the resource corresponding to the preamble and transmit the preamble based on the RACH procedure which is successfully performed in advance.

By such a method, the additional field for indicating the preamble format may not be configured in DCI format N1 for the NPDCCH order.

As still yet another embodiment of the present invention, when only one of the first preamble resource and the second preamble resource is configured at the specific CE level and in the specific carrier indicated through DCI format N1 for the NPDCCH order, the UE may select the preamble resource which exists at the corresponding CE level and in the corresponding carrier and transmit the preamble irrespective of the preamble of the RACH procedure which is successfully performed in advance.

In such a method, the preamble format indicator indicating the preamble format may not be additionally included in DCI format N1 for the NPDCCH order and there is an effect that the degree of freedom of the eNB may be increased.

As still yet another embodiment of the present invention, when only one of the first preamble resource and the second preamble resource is configured at the specific CE level and in the specific carrier indicated through DCI format N1 for the NPDCCH order and the preamble corresponding to the resource configured at the corresponding specific CE level and in the specific carrier is different from the preamble of the RACH procedure which the UE immediately previously performs, the UE may determine that the NPDCCH order is not valid.

In such a method, since the eNB already recognizes the preamble transmitted through the RACH procedure which is immediately previously performed, the UE may predict not to instruct transmission of a preamble different from the recognized preamble.

As still yet another embodiment of the present invention, upon receiving DCI format N1 for the NPDCCH order, the UE may select a preamble resource which is shown first in time among the preamble resources which exist at the specific CE level and in the specific carrier indicated through the corresponding DCI and transmit the preamble.

In this case, the first preamble resource and the second preamble resource may be independently configured on the same CE level and on the same carrier and the RAPID value used for each resource may not exceed 64.

For example, when the RAPID value indicated by the NPDCCH order is one of 0 to 47, the UE may select the resource indicated first in time among the preamble resources existing in the specific carrier level and the specific CE level indicated through the corresponding DCI and transmit the preamble.

In this case, when the RAPID value indicated by the NPDCCH order is one of 48 to 63, the UE may select the second preamble resource and transmit the preamble.

As still yet another embodiment of the present invention, different FDD NPRACH formats may be configured via the SIB (e.g., SIB 2 or SIB 22) depending on the CE level.

In this case, the preamble format may be implicitly indicated to the UE using the "Starting number of NPRACH repetitions" field of DCI format N1 for the NPDCCH order.

That is, the CE level and the NPRACH format match the SIB and the NPRACH format indicates only the CE level to the UE, and as a result, the UE may recognize the preamble format matching with the CE level.

The FDD NPRACH format configured (or matched) for each CE level may be configured differently according to the UE analyzing actual system information (e.g., SIB and RRC).

For example, the eNB may configure to match the CE level and the FDD NPRACH format so as to use FDD NPRACH format 1 for all CE levels (e.g., CE levels 0, 1, and 2) for UEs not supporting Preamble format 2 according to the configuration (e.g., UEs according to Release) of the UE.

However, the eNB may match the CE level and the FDD NPRACH format so that CE levels 0 and 1 use FDD NPRACH format 1 and CE level 2 uses FDD NPRACH format 2 for UEs supporting preamble format 2.

In this case, if the UE does not support FDD NPRACH format 2, the UE may perform the RACH procedure using FDD NPRACH format 1 when being indicated CE level 2 through the NPDCCH order.

However, if the UE does support FDD NPRACH format 2, the UE may perform the RACH procedure using FDD NPRACH format 2 when being indicated CE level 2 through the NPDCCH order.

When such a method is used, a separate indicator may not be added to DCI format N1 for the NPDCCH order in order to indicate the preamble format.

NPRACH Resource for Dedicated Scheduling Request

When the NPRACH resource is used for a dedicated scheduling request (SR), the following methods may be applied.

First, when one or a plurality of carriers of the NPRACH resource is designated as the dedicated SR, dedicated SR resources that may be transmitted using a specific start carrier may multiplexed through TDM for one or more UEs.

Specifically, the number of repetitions of the preamble is determined in advance through the SIB for the NPRACH resource capable of transmitting the dedicated SR. However, the UE for transmitting the dedicated SR already operates in the connected mode and the eNB may receive the dedicated SR even if the preamble is not transmitted repeatedly by the number of repetitions of the preamble corresponding to the corresponding NPRACH resource.

Accordingly, the eNB may inform the UE of a specific NPRACH resource (e.g., carrier and CE level) through the RRC signaling for the dedicated SR.

In this case, a specific set of scaling factors may be specified in the standard, and a value of a scaling factor to be actually used and a timing index (for example, a transmission index based on the scaling factor) to transmit the actual SR may be transmitted to the UE through the RRC signaling.

In this case, the value of the scaling factor may be configured to be specific to the NPRACH resource or specific to the UE.

When the value of the scaling factor is configured to be specific to the UE, the eNB needs to allocate the resource not to overlap with the SR resource of another UE.

For example, if the number of repetitions of the NPRACH corresponding to the set carrier and CE level is 128 and the scaling factor set defined in the standard is $\{0, \frac{1}{2}, \frac{1}{4}, \frac{1}{8}, \frac{1}{16}, \frac{1}{32}, \ldots\}$, the value of the actual scaling factor may be set to $\frac{1}{8}$ and the timing index for SR transmission may be set to 1.

In this case, the UE may repeatedly transmit SR transmissions 16 times from the instant when a 16 (128/8)-th preamble among the single tone resources corresponding to the specific subcarrier index of the NPRACH resource is transmitted.

When such a method is used, the single tone resources for the SR corresponding to the specific subcarrier index may be multiplexed through the TDM scheme and allocated to a plurality of UEs, thereby sufficiently securing a dedicated SR capacity.

Second, similar to the above case, but the eNB may announce SR transmission timing offset information and the number of repetitions for the actual SR simultaneously with announcing the specific NPRACH resource (e.g., carrier and CE level) to the UE through the RRC signaling for the transmission SR.

For example, when the number of repetitions of the NPRACH corresponding to the carrier and CE level set by the UE is 128, the eNB may set the number of SR repetitions to 32 for a specific UE and set a transmission timing offset to 16 (single tone preamble length).

In this case, the specific UE may repeatedly transmit SR transmissions 32 times from the instant when a 16-th preamble among the single tone resources corresponding to the specific subcarrier index of the NPRACH resource is transmitted.

When such a method is used, since the eNB may completely dynamically multiple the single tone resources for the SR corresponding to the specific subcarrier index through the TDM scheme and allocate the multiplexed single tone resources to the plurality of UEs, the dedicated SR capacity may be sufficiently secured and the independent number of repetitions may be allocated to a plurality of UEs requiring the dedicated SR.

As another embodiment of the present invention, when the number of repetitions of the SR transmission set by the UE is smaller than the number of times of preamble repetition of the NPRACH resource capable of transmitting the dedicated SR, the UE may transfer specific information through a transmission start position on the time axis in the NPRACH resource.

In this case, the transmission start position on the time axis may be one of positions where a first symbol group of each preamble which is repeatedly transmitted is transmitted or one of positions where each symbol group may be transmitted.

Further, the specific information may include a buffer state report (BSR).

For example, when the number of NPRACH repetitions corresponding to the set carrier and the CE level is 128 and the number of repetitions of the SR transmission is 32, one of at four different information (128/32) may be transmitted, and one of at most 96 (128-32) different information may be transmitted to the UE.

When such a method is used, additional information may be transmitted to the UE even though the NPRACH preamble is not scrambled by an additional sequence.

Figure 15:
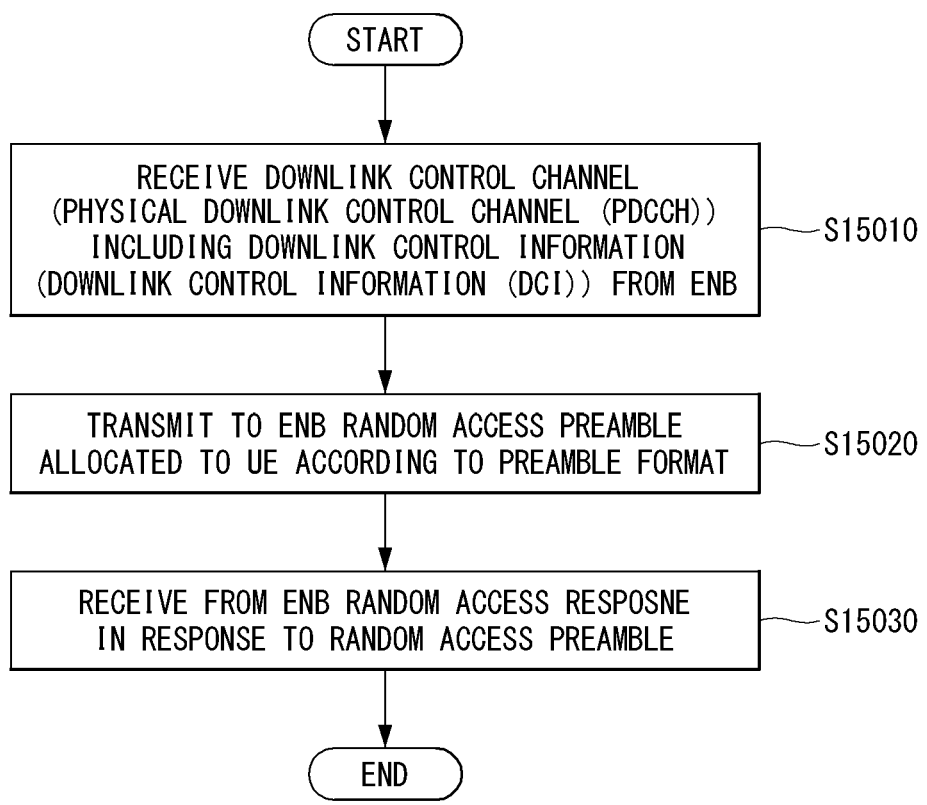
FIG. 15 is a diagram illustrating an example of a method for transmitting a random access preamble by a UE to which the method proposed by this specification may be applied.

FIG. 15 is a diagram illustrating an example of a method for transmitting a random access preamble by a UE to which the method proposed by this specification may be applied.

Referring to FIG. 15, when the UE starts the RACH procedure according to the NPDCCH order, the UE may select the preamble format based on the DCI and transmit the preamble to the eNB.

Hereinafter, it is assumed that the UE supports preamble format 2.

Specifically, the UE may recognize whether the eNB supports preamble format 2 through the higher layer signaling transmitted from the eNB.

For example, the UE may recognize whether the eNB supports preamble format 2 by allocating the resource for transmitting NPRACH format 2 at the CE level transmitted through the higher layer signaling (e.g., SIB, etc.).

Then, the UE may receive the NPDCCH including the DCI to perform the RACH procedure through the NPDCCH order from the eNB (S15010).

In this case, the format of the DCI may be configured by the same format in Table 17 and described above.

Specifically, the DCI may include at least one of a preamble format indicator indicating whether the format of the preamble to be transmitted by the UE (or allocated to the UE) is format 0/1 or format 2, a subcarrier indication which is information related with the subcarrier for transmitting the preamble, a flag indicating the format of the DCI, start number information related to a start number of repetition of the random access procedure, and/or a carrier indication related to the carrier for transmitting the preamble.

The number of bits of the DCI for the RACH procedure initiated by the NPDCCH order may be 24 bits and the remaining bits other than the configured field may be set to a value of '1' to reduce the number of blind decoding times of the UE.

The UE may recognize the format of the preamble to be transmitted by the UE through the preamble format indicator of the DCI.

For example, when the bit value of the preamble format indicator field is '0', the bit value indicates preamble format 0/1 and when the bit value of the preamble format indicator field is '1', the bit value indicates preamble format 2.

Preamble format 0/1 may have the subcarrier spacing of 3.75 kHz as described above and a maximum of 48 RAPIDs may be configured in preamble format 0/1.

Preamble format 2 may have the subcarrier spacing of 1.25 kHz as described above and a maximum of 144 RAPIDs may be configured in preamble format 2.

The subcarrier indication field of the DCI may indicate the subcarrier allocated for preamble transmission of the UE and the number of bits of the field may be changed according to the value of the preamble format indicator.

That is, if the subcarrier spacing of the preamble format indicated by the preamble format indicator becomes small, the number of bits of the preamble format indicator field may be the same or increase.

In this case, the number of bits of the preamble format indicator may be determined by Equation 4.

For example, when the preamble format is 0/1, the maximum number of RAPIDs is 48, and as a result, the maximum number of subcarriers for transmitting the preamble becomes 48. Therefore, the preamble format indicator may become 6 bits in order to represent each of 48 sub carriers.

However, when the preamble format is 2, the maximum number of RAPIDs is 144, and as a result, the maximum number of subcarriers for transmitting the preamble becomes 144. Therefore, the preamble format indicator may become 8 bits in order to represent each of 144 sub carriers.

Then, the UE may transmit the preamble to the eNB on the subcarrier allocated to the UE according to the preamble format indicated by the DCI (S15020).

For example, in the case of preamble format 0/1 indicated by the DCI, the UE may transmit the preamble (first preamble) in preamble format 0/1 to the eNB and in the case of preamble format 2, the UE may transmit the preamble (second preamble) in preamble format 2 to the eNB.

Thereafter, the UE may receive a random access response message from the eNB in response to the preamble (S15030).

Thereafter, according to whether the RACH procedure is a contention based RACH, the UE may perform a corresponding procedure.

When preamble formats having different subcarrier spacings are configured by such a method, the UE may recognize which preamble format the preamble to be transmitted by the UE has and the number of bits of a specific field of the DCI format is changed according to the preamble format, thereby efficiently allocating the subcarrier for preamble transmission.

Figure 17:
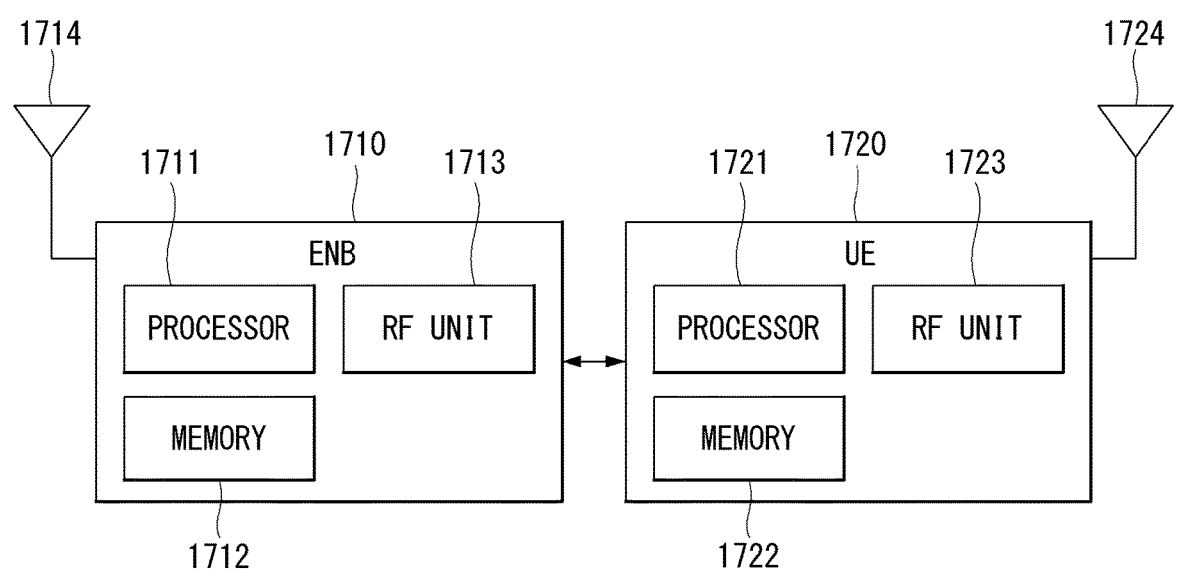
FIG. 17 illustrates a block diagram of a wireless communication device to which methods proposed by this specification may be applied.
Figure 18:
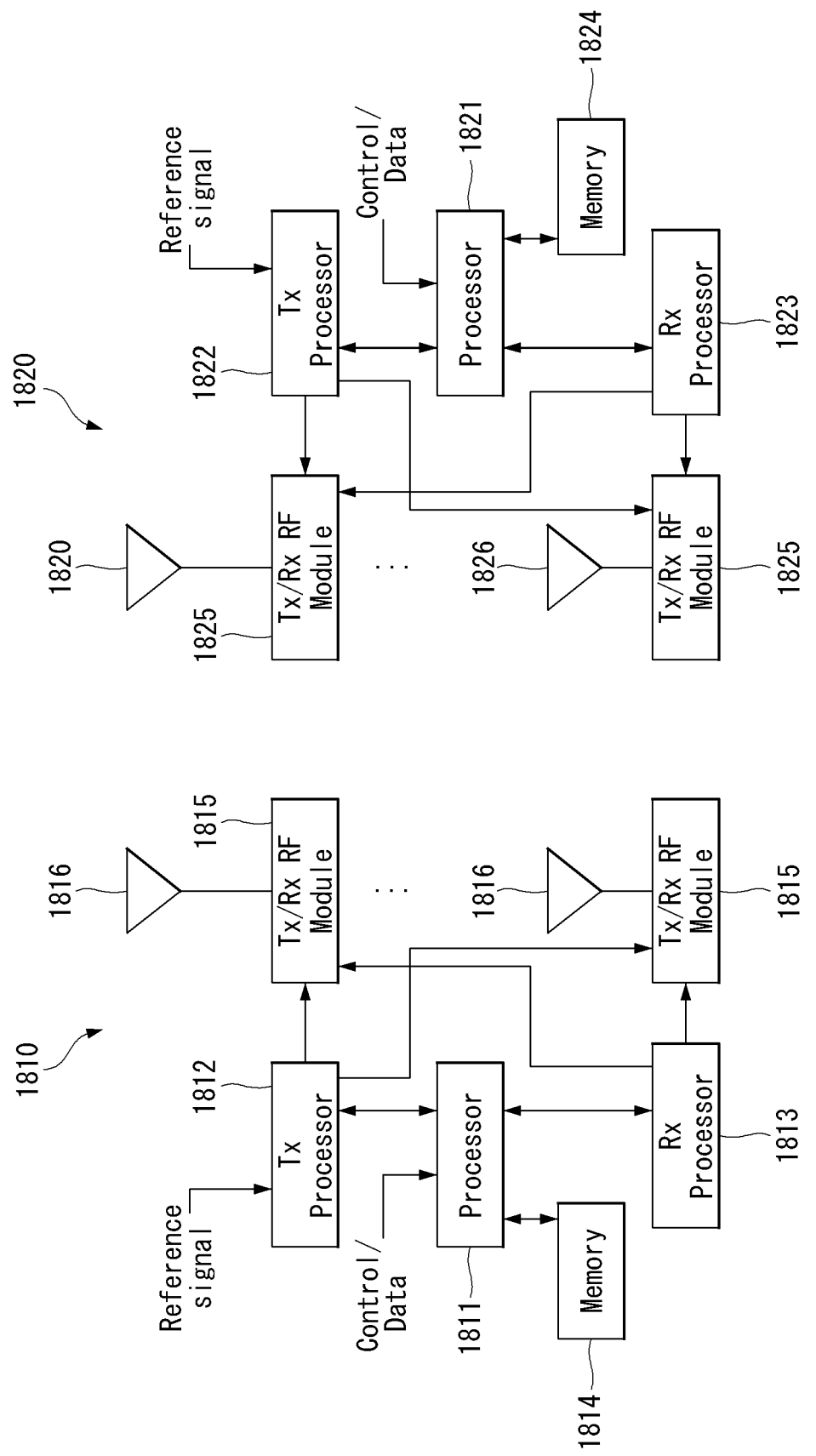
FIG. 18 illustrates another example of the block diagram of the wireless communication device to which the methods proposed in this specification may be applied.

In this regard, the operation of the UE described above may be specifically implemented by terminal devices 1720 and 1820 illustrated in FIGS. 17 and 18 of this specification. For example, the operation of the UE described above may be performed by processors 1721 and 1821 and/or RF units (or modules) 1723 and 1825.

Specifically, the processors 1721 and 1821 may recognize whether the eNB supports preamble format 2 through the higher layer signaling transmitted from the eNB.

For example, the processors 1721 and 1821 may recognize whether the eNB supports preamble format 2 by allocating the resource for transmitting NPRACH format 2 at the CE level transmitted through the higher layer signaling (e.g., SIB, etc.).

Further, the processors 1721 and 1821 may control to receive the NPDCCH including the DCI in order to perform the RACH procedure through the NPDCCH order from the eNB through the RF units (or modules) 1723 and 1825.

In this case, the format of the DCI may be configured by the same format in Table 17 and described above.

Specifically, the DCI may include at least one of a preamble format indicator indicating whether the format of the preamble to be transmitted by the UE (or allocated to the UE) is format 0/1 or format 2, a subcarrier indication which is information related with the subcarrier for transmitting the preamble, a flag indicating the format of the DCI, start number information related to a start number of repetition of the random access procedure, and/or a carrier indication related to the carrier for transmitting the preamble.

The number of bits of the DCI for the RACH procedure initiated by the NPDCCH order may be 24 bits and the remaining bits other than the configured field may be set to a value of '1' to reduce the number of blind decoding times of the UE.

The UE may recognize the format of the preamble to be transmitted by the UE through the preamble format indicator of the DCI.

For example, when the bit value of the preamble format indicator field is '0', the bit value indicates preamble format 0/1 and when the bit value of the preamble format indicator field is '1', the bit value indicates preamble format 2.

Preamble format 0/1 may have the subcarrier spacing of 3.75 kHz as described above and a maximum of 48 RAPIDs be configured in preamble format 0/1.

Preamble format 2 may have the subcarrier spacing of 1.25 kHz as described above and a maximum of 144 RAPIDs may be configured in preamble format 2.

The subcarrier indication field of the DCI may indicate the subcarrier allocated for preamble transmission of the UE and the number of bits of the field may be changed according to the value of the preamble format indicator.

That is, if the subcarrier spacing of the preamble format indicated by the preamble format indicator becomes small, the number of bits of the preamble format indicator field may be the same or increase.

In this case, the number of bits of the preamble format indicator may be determined by Equation 4.

For example, when the preamble format is 0/1, the maximum number of RAPIDs is 48, the maximum number of subcarriers for transmitting the preamble becomes 48. Therefore, the preamble format indicator may become 6 bits in order to represent each of 48 subcarriers.

However, when the preamble format is 2, the maximum number of RAPIDs is 144, and as a result, the maximum number of subcarriers for transmitting the preamble becomes 144.

Therefore, the preamble format indicator may become 8 bits in order to represent each of 144 sub carriers.

Thereafter, the processors 1821 and 1921 may control to transmit the preamble to the eNB in the subcarrier allocated to the UE according to the preamble format indicated by the DCI through the RF units (or modules) 1723 and 1825.

For example, in the case of preamble format 0/1 indicated by the DCI through the RF units (or modules) 1723 and 1825, the processors 1821 and 1921 may transmit the preamble (first preamble) in preamble format 0/1 to the eNB and in the case of preamble format 2, the processors 1821 and 1921 may transmit the preamble (second preamble) in preamble format 2 to the eNB.

Thereafter, the processors 1821 and 1921 may control to receive the random access response message from the eNB through the RF units (or modules) 1713 and 1815 in response to the preamble and control to perform each corresponding procedure according to the RACH procedure is the contention based RACH.

Figure 16:
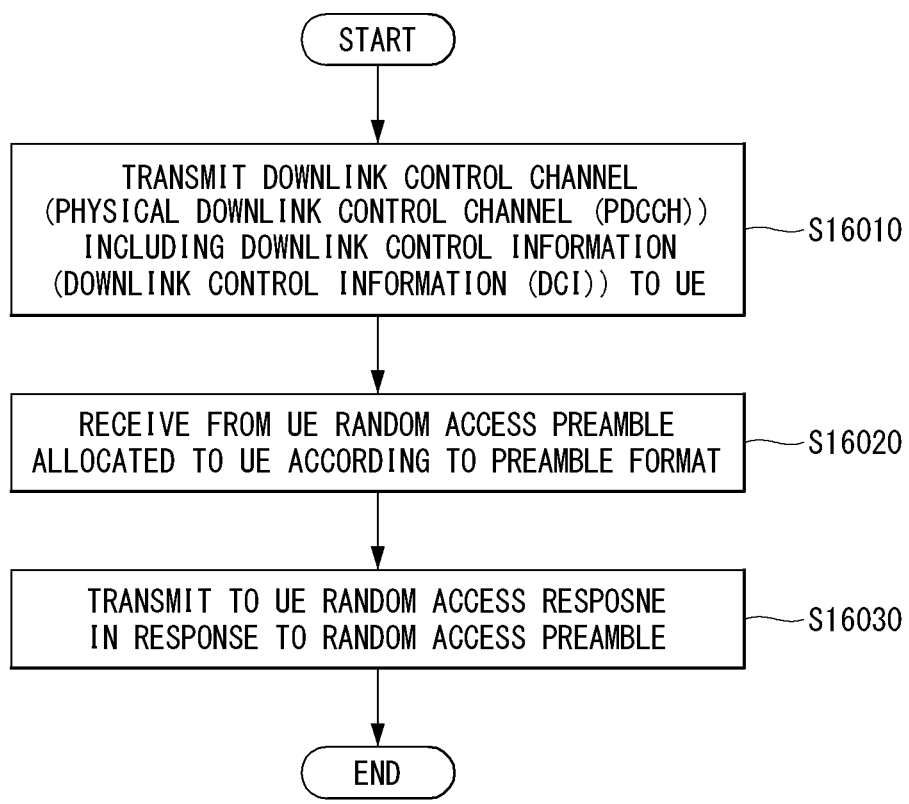
FIG. 16 is a diagram illustrating an example of a method for receiving a random access preamble by a base station to which the method proposed by this specification may be applied.

FIG. 16 is a diagram illustrating an example of a method for receiving a random access preamble by a base station to which the method proposed by this specification may be applied.

Referring to FIG. 16, when the eNB *starts* the RACH procedure according to the NPDCCH order, the eNB may announce to the UE the preamble format of the preamble to be transmitted by the UE through the DCI.

Specifically, first, the eNB may announce whether the eNB supports preamble format 2 through the higher layer signaling transmitted from the UE.

For example, the eNB may announce to the UE whether the eNB supports preamble format 2 by allocating the resource for transmitting NPRACH format 2 at the CE level transmitted through the higher layer signaling (e.g., SIB, etc.).

Thereafter, the eNB may transmit, to the UE, a Physical Downlink Control Channel (PDCCH) including Downlink Control Information (DCI) in order to perform the RACH procedure through the NPDCCH order.

In this case, the format of the DCI may be configured by the same format in Table 17 and described above.

Specifically, the DCI may include at least one of a preamble format indicator indicating whether the format of the preamble to be transmitted by the UE (or allocated to the UE) is format 0/1 or format 2, a subcarrier indication which is information related with the subcarrier for transmitting the preamble, a flag indicating the format of the DCI, start number information related to a start number of repetition of the random access procedure, and/or a carrier indication related to the carrier for transmitting the preamble.

The number of bits of the DCI for the RACH procedure initiated by the NPDCCH order may be 24 bits and the remaining bits other than the configured field may be set to a value of '1' to reduce the number of blind decoding times of the UE.

The UE may recognize the format of the preamble to be transmitted by the UE through the preamble format indicator of the DCI.

For example, when the bit value of the preamble format indicator field is '0', the bit value indicates preamble format 0/1 and when the bit value of the preamble format indicator field is '1', the bit value indicates preamble format 2.

Preamble format 0/1 may have the subcarrier spacing of 3.75 kHz as described above and a maximum of 48 RAPIDs be configured in preamble format 0/1.

Preamble format 2 may have the subcarrier spacing of 1.25 kHz as described above and a maximum of 144 RAPIDs may be configured in preamble format 2.

The subcarrier indication field of the DCI may indicate the subcarrier allocated for preamble transmission of the UE and the number of bits of the field may be changed according to the value of the preamble format indicator.

That is, if the subcarrier spacing of the preamble format indicated by the preamble format indicator becomes small, the number of bits of the preamble format indicator field may be the same or increase.

In this case, the number of bits of the preamble format indicator may be determined by Equation 4.

For example, when the preamble format is 0/1, the maximum number of RAPIDs is 48, and as a result, the maximum number of subcarriers for transmitting the preamble becomes 48. Therefore, the preamble format indicator may become 6 bits in order to represent each of 48 sub carriers.

However, when the preamble format is 2, the maximum number of RAPIDs is 144, and as a result, the maximum number of subcarriers for transmitting the preamble becomes 144. Therefore, the preamble format indicator may become 8 bits in order to represent each of 144 sub carriers.

Then, the eNB may receive the preamble to the UE on the subcarrier allocated to the UE according to the preamble format indicated by the DCI (S16020).

For example, in the case of preamble format 0/1 indicated by the DCI, the eNB may receive the preamble (first preamble) in preamble format 0/1 from the UE and in the case of preamble format 2, the eNB may receive the preamble (second preamble) in preamble format 2 from the terminal.

Thereafter, the eNB may transmit the random access response message to the UE in response to the preamble (S16030).

Thereafter, according to whether the RACH procedure is the contention based RACH, the eNB may perform each corresponding procedure.

In this regard, the operation of the eNB described above may be specifically implemented by base station devices 1710 and 1810 illustrated in FIGS. 17 and 18 of this specification. For example, the operation of the eNB described above may be performed by the processors 1711 and 1811 and/or RF units (or modules) 1713 and 1815.

Specifically, the processors 1711 and 1811 may announce whether the eNB supports preamble format 2 through the higher layer signaling transmitted to the UE.

For example, the processors 1711 and 1811 may announce to the UE whether the eNB supports preamble format 2 through whether to allocate the resource for transmitting NPRACH format 2 at the CE level transmitted through the higher layer signaling (e.g., SIB, etc.), for example.

Further, the processors 1711 and 1811 may control to transmit, to the UE, a Physical Downlink Control Channel (PDCCH) including Downlink Control Information (DCI) in order to perform the RACH procedure through the NPDCCH order through the RF units (or modules) 1713 and 1815.

In this case, the format of the DCI may be configured by the same format in Table 17 and described above.

Specifically, the DCI may include at least one of a preamble format indicator indicating whether the format of the preamble to be transmitted by the UE (or allocated to the UE) is format 0/1 or format 2, a subcarrier indication which is information related with the subcarrier for transmitting the preamble, a flag indicating the format of the DCI, start number information related to a start number of repetition of the random access procedure, and/or a carrier indication related to the carrier for transmitting the preamble.

The number of bits of the DCI for the RACH procedure initiated by the NPDCCH order may be 24 bits and the remaining bits other than the configured field may be set to a value of '1' to reduce the number of blind decoding times of the UE.

The UE may recognize the format of the preamble to be transmitted by the UE through the preamble format indicator of the DCI.

For example, when the bit value of the preamble format indicator field is '0', the bit value indicates preamble format 0/1 and when the bit value of the preamble format indicator field is '1', the bit value indicates preamble format 2.

Preamble format 0/1 may have the subcarrier spacing of 3.75 kHz as described above and a maximum of 48 RAPIDs be configured in preamble format 0/1.

Preamble format 2 may have the subcarrier spacing of 1.25 kHz as described above and a maximum of 144 RAPIDs may be configured in preamble format 2.

The subcarrier indication field of the DCI may indicate the subcarrier allocated for preamble transmission of the UE and the number of bits of the field may be changed according to the value of the preamble format indicator.

That is, if the subcarrier spacing of the preamble format indicated by the preamble format indicator becomes small, the number of bits of the preamble format indicator field may be the same or increase.

In this case, the number of bits of the preamble format indicator may be determined by Equation 4.

For example, when the preamble format is 0/1, the maximum number of RAPIDs is 48, and as a result, the maximum number of subcarriers for transmitting the preamble becomes 48. Therefore, the preamble format indicator may become 6 bits in order to represent each of 48 sub carriers.

However, when the preamble format is 2, the maximum number of RAPIDs is 144, and as a result, the maximum number of subcarriers for transmitting the preamble becomes 144. Therefore, the preamble format indicator may become 8 bits in order to represent each of 144 sub carriers.

Thereafter, the processors 1811 and 1911 may control to receive the preamble from the UE in the subcarrier allocated to the UE according to the preamble format indicated by the DCI through the RF units (or modules) 1713 and 1815.

For example, in the case of preamble format 0/1 indicated by the DCI through the RF units (or modules) 1713 and 1815, the processors 1811 and 1911 may control to receive the preamble (first preamble) in preamble format 0/1 from the UE and in the case of preamble format 2, the processors 1821 and 1921 may control to receive the preamble (second preamble) in preamble format 2 from the UE.

Thereafter, the processors 1821 and 1921 may control to transmit the random access response message from the UE through the RF units (or modules) 1713 and 1815 in response to the preamble and control to perform each corresponding procedure according to the RACH procedure is the contention based RACH.

Overview of Devices to which Present Invention is Applicable

FIG. 17 illustrates a block diagram of a wireless communication device to which methods proposed by this specification may be applied.

Referring to FIG. 17, a wireless communication system includes an eNB 1710 and multiple user equipments 1720 positioned within an area of the base station.

Each of the eNB and the UE may be expressed as a wireless device.

The base station 1710 includes a processor 1711, a memory 1712, and a radio frequency (RF) module 1713. The processor 1711 implements a function, a process, and/or a method which are proposed in FIGS. 1 to 16 above. Layers of a radio interface protocol may be implemented by the processor. The memory is connected with the processor to store various information for driving the processor. The RF module is connected with the processor to transmit and/or receive a radio signal.

The UE includes a processor 1721, a memory 1722, and an RF module 1723.

The processor implements a function, a process, and/or a method which are proposed in FIGS. 1 to 16 above. Layers of a radio interface protocol may be implemented by the processor. The memory is connected with the processor to store various information for driving the processor. The RF module 1723 is connected with the processor to transmit and/or receive a radio signal.

The memories 1712 and 1722 may be positioned inside or outside the processors 1711 and 1721 and connected with the processor by various well-known means.

Further, the eNB and/or the UE may have a single antenna or multiple antennas.

FIG. 18 illustrates another example of the block diagram of the wireless communication device to which the methods proposed in this specification may be applied.

Referring to FIG. 18, a wireless communication system includes an eNB 1810 and multiple user equipments 1820 positioned within an area of the base station. The eNB may be represented by a transmitting apparatus and the UE may be represented by a receiving apparatus, or vice versa. The eNB and the UE include processors 1811.1821 and 1814.1824, memories 1815.1825 and 1812.1822, one or more Tx/Rx radio frequency (RF) modules 1813.1823 and 1816.1826, Tx processors 2112 and 2122, Rx processors 2113 and 2123, and antennas 2116 and 2126. The processor implements a function, a process, and/or a method which are described above. More specifically, a higher layer packet from a core network is provided to the processor 1811 in DL (communication from the eNB to the UE). The processor implements a function of an L2 layer. In the DL, the processor provides multiplexing between a logical channel and a transmission channel and allocation of radio resources to the UE 1820, and takes charge of signaling to the UE. The transmit (TX) processor 1812 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1816 via individual Tx/Rx modules (or transceivers) 1815. Each Tx/Rx module may modulate an RF carrier into each spatial stream for transmission. In the UE, each Tx/Rx module (or transceiver, 1825) receives a signal through each antenna 1826 of each Tx/Rx module. Each Tx/Rx module reconstructs information modulated with the RF carrier and provides the reconstructed information to the receive (RX) processor 1823. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the base station. The soft decisions may be based on channel estimation values. The soft decisions are decoded and deinterleaved to reconstruct data and control signals originally transmitted by the eNB on the physical channel. The corresponding data and control signals are provided to the processor 1821.

UL (communication from the UE to the base station) is processed by the eNB 1810 in a scheme similar to a scheme described in association with a receiver function in the UE 1820. Each Tx/Rx module 1825 receives the signal through each antenna 1826. Each Tx/Rx module provides the RF carrier and information to the RX processor 1823. The processor 1821 may be associated with the memory 1824 storing a program code and data. The memory may be referred to as a computer readable medium.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

An example is applied to the 3GPP LTE/LTE-A/NR system is described primarily, but it is possible to apply the RRC connection method to various wireless communication systems in addition to the 3GPP LTE/LTE-A/NR system.

The invention claimed is:

1. A method of transmitting a random access preamble, by a user equipment (UE), in a wireless communication system supporting a narrow band-Internet of things (NB-IoT), the method comprising:
receiving, from a base station (BS), Downlink Control Information (DCI) including (i) preamble format indicator and (ii) subcarrier indicator; and
transmitting, to the BS, the random access preamble on an allocated subcarrier based on the DCI,
wherein the preamble format indicator indicates whether a format of the random access preamble is format 0/1 or format 2,
wherein, based on the format being format 0/1, the subcarrier indicator is 6 bits, and
wherein, based on the format being format 2, the subcarrier indicator is 8 bits.

2. The method of claim 1,
wherein the format is format 0/1, when a value of the preamble format indicator is '0', and
wherein the format is format 2, when the value of the preamble format indicator is '1'.

3. The method of claim 1, further comprising:
receiving, from the BS, a random access response in response to the random access preamble.

4. The method of claim 1,
wherein when the maximum number of IDs of the random access preamble is $RAPID_{max}$, a bit number of the subcarrier indicator is calculated through the following equation, $$[\log_2(RAPID_{MAX})].$$

5. The method of claim 1,
wherein the bit number of the subcarrier indicator is the same or increases, based on a value of a subcarrier spacing.

6. The method of claim 1,
wherein the DCI further includes a flag indicating a format of the DCI, start number information associated with a start number of repetition of a random access procedure, and a carrier indication associated with a carrier for transmitting the random access preamble.

7. The method of claim 6,
wherein the remaining bit number of the DCI is set to a value of 1.

8. The method of claim 1,
wherein a subcarrier spacing of the format 0/1 is 3.75 kHz and a subcarrier spacing of the format 2 is 1.25 kHz.

9. The method of claim 1,
wherein the maximum number of subcarriers allocated for the random access preamble in the format 0/1 is 48, and
wherein the maximum number of subcarriers allocated for the random access preamble in the format 2 is 144.

10. The method of claim 1, further comprising:
receiving, from the BS, system information associated with the preamble format supported by the BS.

11. A method of receiving a random access preamble, by a base station (BS), in a wireless communication system supporting a narrow band-Internet of things (NB-IoT), the method comprising:
transmitting, to a user equipment (UE), Downlink Control Information (DCI) including (i) preamble format indicator and (ii) subcarrier indicator; and
receiving, from the UE, the random access preamble in an allocated subcarrier based on the DCI,
wherein the preamble format indicator indicates whether a format of the random access preamble is format 0/1 or format 2,
wherein, based on the format being format 0/1, the subcarrier indicator is 6 bits, and
wherein, based on the format being format 2, the subcarrier indicator is 8 bits.

12. A user equipment (UE) transmitting a random access preamble in a wireless communication system supporting a narrow band-Internet of things (NB-IoT), the UE comprising:
at least one transceiver for transmitting and receiving a radio signal; and
at least one processor functionally connected with the at least one transceiver,
wherein the at least one processor is configured to
receive, from a base station (BS), Downlink Control Information (DCI) including (i) preamble format indicator and (ii) subcarrier indicator; and
transmit, to the BS, the random access preamble on an allocated subcarrier based on the DCI,
wherein the preamble format indicator indicates whether a format of the random access preamble is format 0/1 or format 2, wherein, based on the format being format 0/1, the subcarrier indicator is 6 bits, and wherein, based on the format being format 2, the subcarrier indicator is 8 bits.

* * * * *